United States Patent [19]

Sellew et al.

[11] Patent Number: 4,869,877

[45] Date of Patent: Sep. 26, 1989

[54] COMPOSTING FACILITY

[75] Inventors: Paul C. Sellew, Lebanon; Geoff Kuter, West Hartford, both of Conn.

[73] Assignee: International Process Systems, Lebanon, Conn.

[21] Appl. No.: 87,105

[22] Filed: Aug. 19, 1987

[51] Int. Cl.$^4$ .......................... C05F 1/02; C05F 3/06; C05F 9/02

[52] U.S. Cl. .......................... 422/111; 71/9; 71/11; 71/12; 71/13; 71/14; 71/23; 71/24; 71/25; 422/184; 422/188; 422/225; 422/233; 422/236

[58] Field of Search ................. 422/11, 184, 188, 225, 422/232, 233, 236; 71/9, 11–14, 25, 23, 24

[56] References Cited

U.S. PATENT DOCUMENTS

| | | |
|---|---|---|
| 1,029,378 | 6/1912 | Lawton . |
| 2,798,800 | 7/1957 | Geraghty et al. . |
| 3,054,663 | 9/1962 | Kromline . |
| 3,246,953 | 4/1966 | Redman et al. . |
| 3,272,596 | 9/1966 | Sackett, Jr. . |
| 3,298,821 | 1/1967 | Pierson . |
| 3,323,896 | 6/1967 | Elmhurst . |
| 3,438,740 | 4/1969 | Brown .................... 71/9 |
| 3,451,799 | 6/1969 | Brown .................... 71/9 |
| 3,756,784 | 8/1973 | Pittwood . |
| 3,960,718 | 6/1976 | Lebo . |
| 4,062,770 | 12/1977 | Kneer .................... 71/9 |
| 4,146,382 | 3/1979 | Willisch .................... 71/9 |
| 4,193,786 | 3/1980 | Brill .................... 71/9 |
| 4,236,910 | 12/1980 | Norin et al. .................... 71/9 |
| 4,249,929 | 2/1981 | Kneer .................... 71/9 |
| 4,264,352 | 4/1981 | Houser .................... 71/9 |
| 4,288,241 | 9/1981 | Shelef .................... 71/9 |
| 4,297,122 | 10/1981 | Wallace .................... 71/12 |
| 4,317,671 | 3/1982 | Willisch .................... 71/9 |
| 4,384,878 | 5/1983 | Nordlund et al. .................... 71/9 |
| 4,392,881 | 7/1983 | Kneer .................... 71/9 |
| 4,519,831 | 5/1985 | Moore .................... 71/13 |
| 4,559,073 | 12/1985 | Minato et al. .................... 71/9 |
| 4,643,111 | 2/1987 | Jones .................... 110/234 |

FOREIGN PATENT DOCUMENTS

2520640 11/1976 Fed. Rep. of Germany ............ 71/9

OTHER PUBLICATIONS

AG-Ways International, Inc., KOJI-MACHI Mansion, rm. 113, 5-3 Koji-Machi, Chiyoda-Ku 102, Japan, phone 03-230-0346, Japan.

"Effects of Aeration and Temperature on Composting of Municipal Sludge in a Full-Scale Vessel System", by G. Kuter, et al., Journal Water Pollution Control Federation, vol. 57, No. 4, Apr., 1985, pp. 309–315.

"Biokinetic Analyses of Adaption and Succession: Microbial Activity in Composting Municipal Sewage Sludge", McKinley, et al., Applied and Environmental Microbiology, vol. 47, No. 5, May, 1984, pp. 933–941.

*Primary Examiner*—Barry S. Richman
*Assistant Examiner*—Timothy M. McMahon
*Attorney, Agent, or Firm*—Scully, Scott, Murphy & Presser

[57] ABSTRACT

A composting facility comprising an elongated composting bay, a compost handling machine, and a ventilation system. The composting bay holds organic waste material while that material composts; and the compost handling machine is adapted to agitate the compost in, and to move the compost along, the bay. The ventilation system selectively conducts air into the compost, and this system includes a sensor, recessed in the bay, to actuate the ventilation system when the temperature of the compost rises above a preset value. Preferably, the temperature of the compost varies along the length of the bay, and the ventilation system includes a multitude of sensors to actuate the ventilation system to conduct air selectively into different sections of the bay to maintain a desired compost temperature profile.

13 Claims, 11 Drawing Sheets

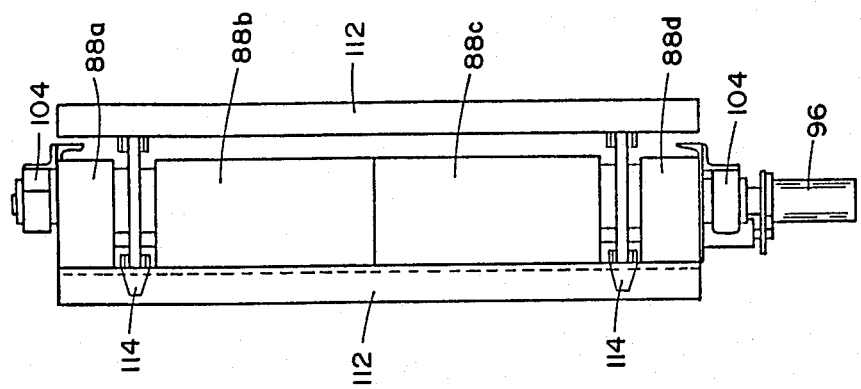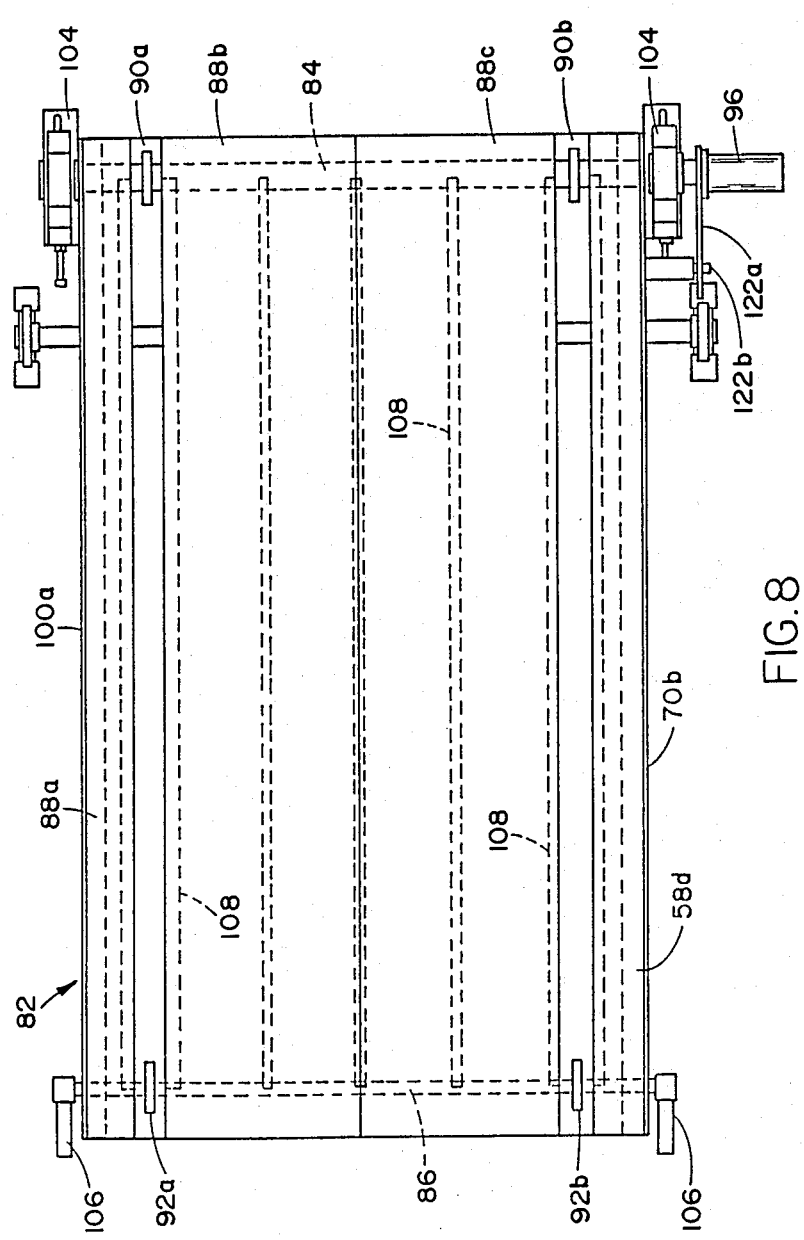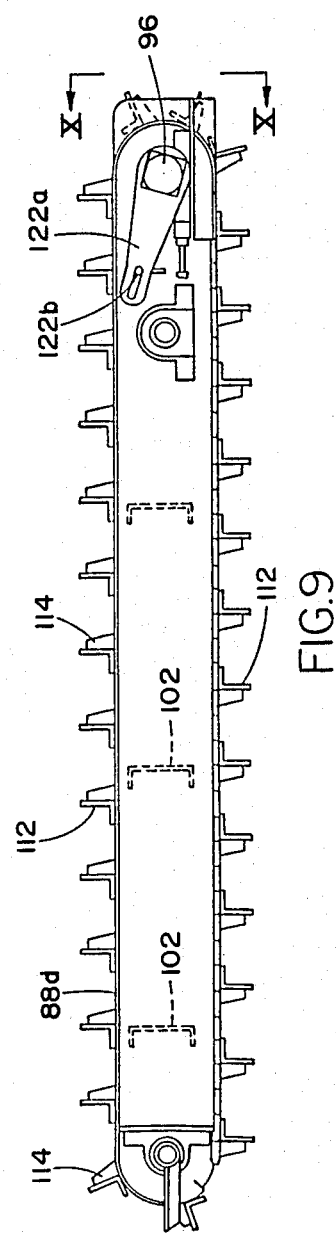

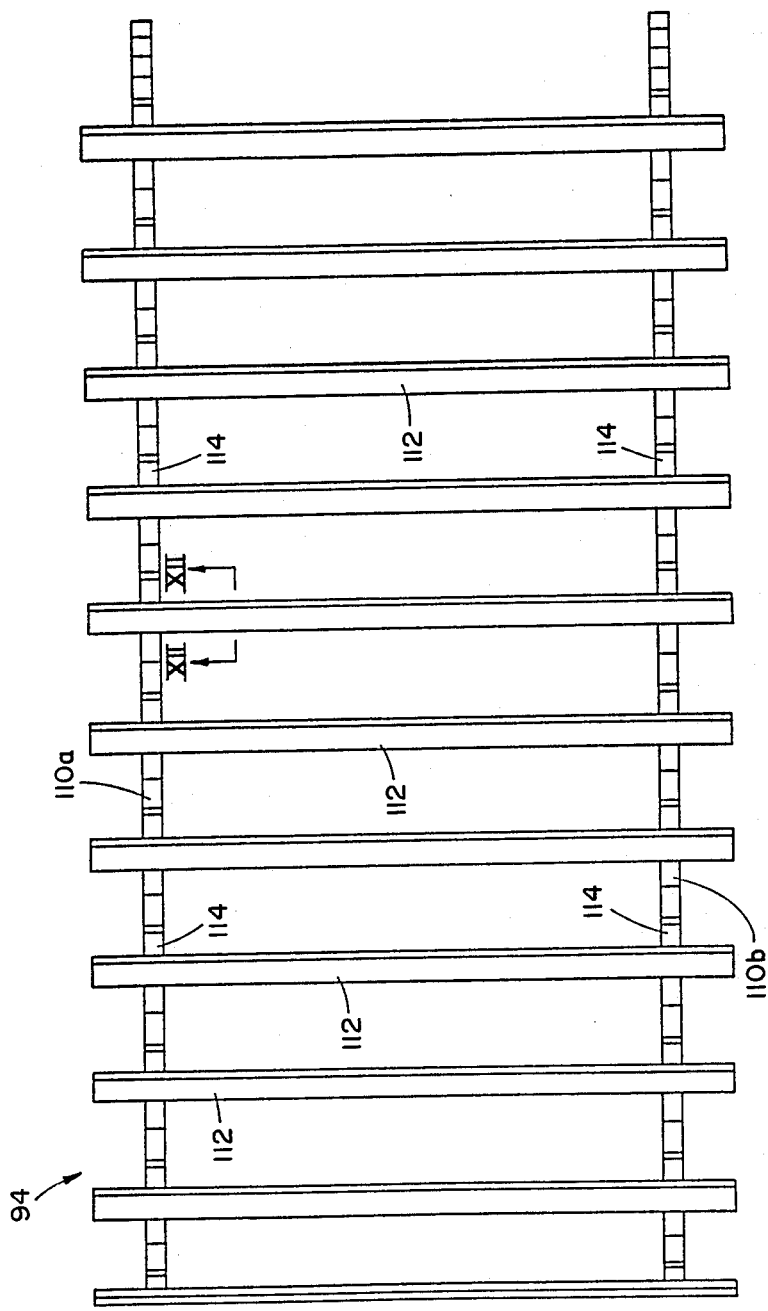
FIG.11
FIG.12
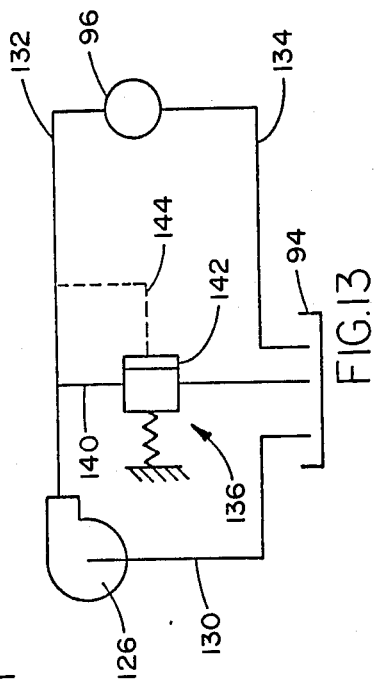
FIG.13

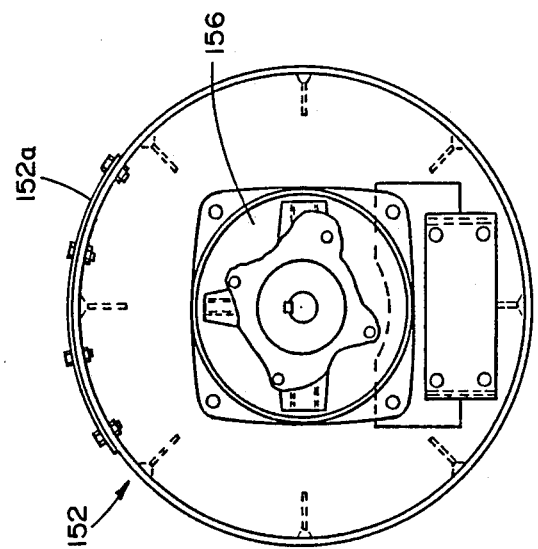
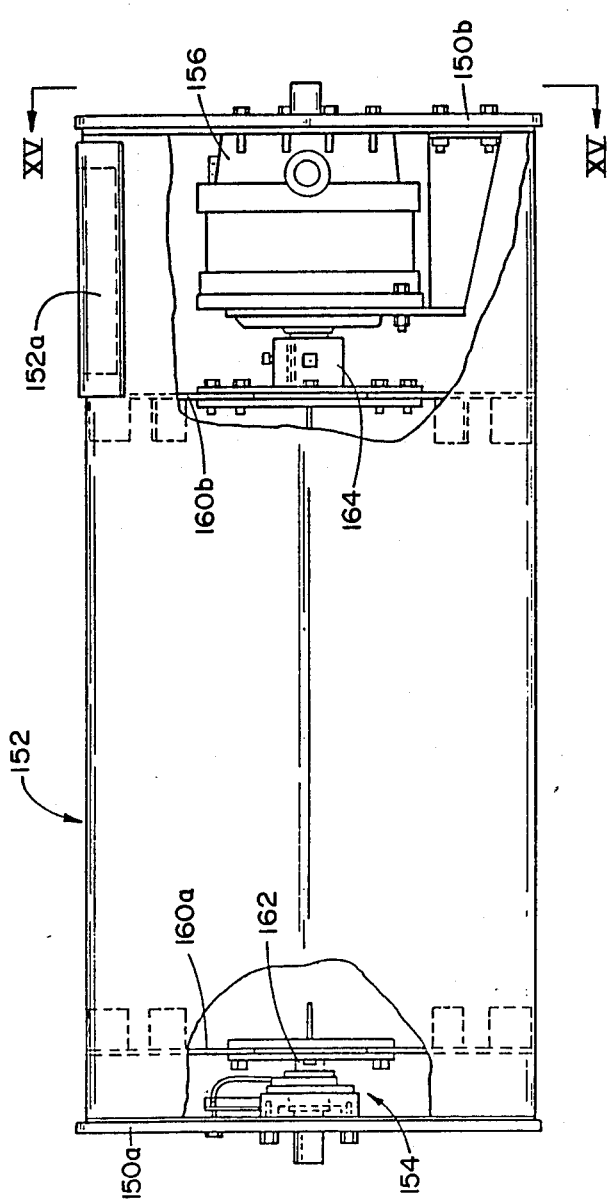
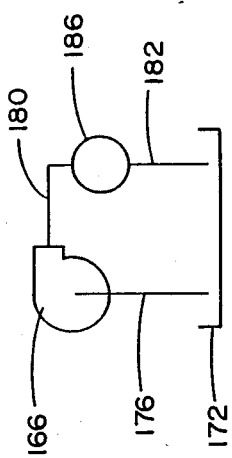
FIG.15
FIG.14
FIG.16

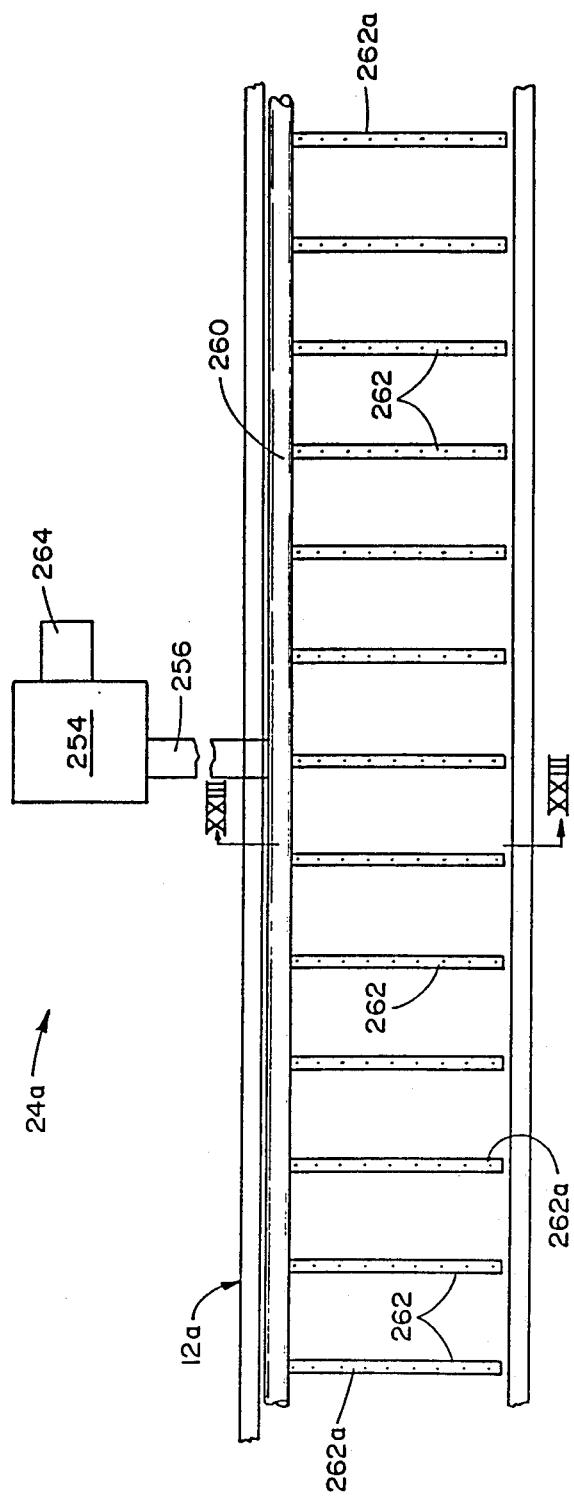
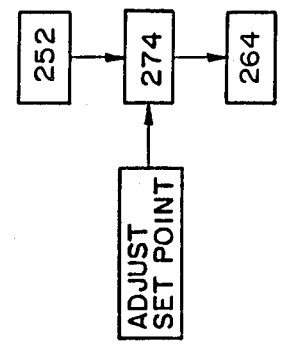
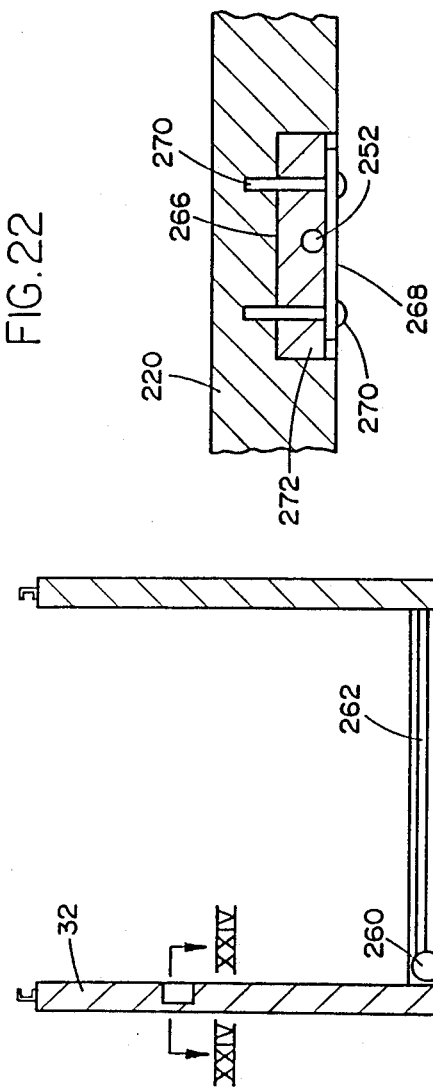
FIG.22
FIG.25
FIG.24
FIG.23

COMPOSTING FACILITY

BACKGROUND OF THE INVENTION

This invention generally relates to a facility for decomposing waste material to produce a useful compost; and more particularly, to a large scale, highly automated system for decomposing waste material.

Organic matter is naturally decomposed by various types of micro organisms, and the end product of such decomposition is frequently a stable material that is useful in supporting life by virtue of its soil nutrient properties. Many attempts have been made to duplicate the natural processes of decomposition, for such decomposition presents an excellent solution to the problem of usefully disposing of the large amounts of unhealthful organic waste materials produced in today's society. An example of this problem in one of its most important forms is the need to find a healthful and useful way of disposing of the huge amounts of refuse which are constantly accumulated in modern municipalities.

Although numerous attempts have been made to successfully apply the process of bacterial decomposition to municipal refuse on a practical commercial scale, few, if any, of these previous attempts have enjoyed success of any magnitude as evidenced by the fact that the vast majority of the cities in this country still dispose of municipal refuse by burying it or by subjecting it to incineration. Not only do the latter processes constitute a financial liability to the municipality, but they also are not a complete answer to the sanitation problem, since various odors and unhealthful air pollution result from incineration, and since the burial process usually allows the refuse to be exposed long enough to become infested with disease-carrying vermin.

There are several reasons why biological decomposition of municipal refuse has not been widely accepted as a means of disposing of such refuse. First, the time required to convert the refuse to a useful, or at least safe, final product has been of such duration that cities producing large volumes of such refuse have not found it practical to attempt to dispose of refuse in this manner. In some cases, treating the refuse with microorganisms to effect its decomposition and stabilization in a useful product has required more than a month. Secondly, the process of biological decomposition has all too frequently been accompanied by the evolution of noxious gases, or at least gases having a very undesirable odor. It is well known that these obnoxious gases are products of the putrefaction of organic matter by the type of bacteria which are characterized as anaerobic bacteria (that is, those which reproduce and thrive in the absence of oxygen). Nevertheless, the composting processes thus far utilized have not, as a rule, enjoyed a high degree of success in suppressing anaerobic bacterial action and in promoting the substantially odorless oxidative action of aerobic bacteria.

Another reason for the previous lack of widespread acceptance of composting as a means of disposing of municipal refuse has been the failure of many of these processes to yield a completely stable and innocuous product. In general, the stability of the final product can be increased, but at the sacrifice of an increase in the time required to completely compost and stabilize the refuse so that the solution of one of the problems only results in the aggravation of another. Moreover, prior art, large scale composting systems usually require a considerable amount of human labor, either to operate the system or various pieces of equipment used in the system, or at least to supervise that operation.

SUMMARY OF THE INVENTION

An object of this invention is to provide a large scale, fully enclosed, highly automated composting facility.

Another object of the present invention is to automatically control the temperature of compost held in a composting bay.

A further object of this invention is to provide thermal sensors to help control the temperature of compost in a composting bay, and to locate those sensors in the bay at a position where the sensors do not interfere with agitation of the compost or movement of the compost along the bay. Another object of this invention is to aerate and to control the temperature of compost in a composting bay to increase microbial activity during the composting and thereby decrease the time required to obtain a stable compost product. These and other objectives are attained with a composting facility comprising an elongated composting bay, a compost handling machine, and a ventilation system. The composting bay is provided to receive organic waste material and to hold that material while it composts, and the bay includes a frame defining an interior of the bay. The compost handling machine is adapted to move along the frame and to extend into the compost bay to agitate the compost in, and to move the compost along, that bay. The ventilation system is in communication with the interior of the bay to selectively conduct air into the compost to ventilate the compost and to help control the temperature thereof, and the ventilation system includes a sensor located in the bay to sense the temperature of the compost and to actuate the ventilation system to conduct air into the compost when the temperature thereof rises above a preset value.

Preferably, the frame of the bay defines a recess extending outward from the interior of the bay, and the sensor is located in this recess. With this preferred embodiment, the bay further includes a cover plate releasably connected to the frame, and covering the recess to hold the sensor therein and to keep the compost out of that recess. Moreover, preferably, the temperature of the compost varies along the length of the bay, and the ventilation system includes a multitude of sensors to actuate the ventilation system to selectively conduct air into different sections of the bay to maintain a desired compost temperature profile.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 8 is a plan view of a portion of the conveyor subassembly of the machine, taken along the line VIII—VIII of FIG. 5 but with the lifting cleats and chains of the conveyor subassembly removed.

FIG. 9 is a side view of the conveyor subassembly.

FIG. 10 is a view taken along line X—X of FIG. 9.

FIG. 11 is a plan view of the lifting cleats and chains of the conveyor subassembly, taken along line XI—XI of FIG. 5.

FIG. 12 is an enlarged side view showing one carrying cleat of the conveyor subassembly, taken along line XII—XII of FIG. 11.

FIG. 13 shows a motor control circuit for the conveyor subassembly.

FIG. 14 is a top view of the drum of the compost handling machine, with portions of the drum broken away to show the interior thereof.

FIG. 15 is a side view of the drum, taken along line XV—XV of FIG. 14.

FIG. 16 shows a motor control circuit for the drum.

FIG. 22 is an enlarged plan view of a portion of one bay of the composting facility, and in particular, showing a portion of the ventilation system of the facility.

FIG. 23 is a cross-sectional view taken along line XXIII—XXIII of FIG. 22, and also showing details of the ventilation system.

FIG. 24 is a cross-sectional view taken along line XXIV—XXIV of FIG. 23, and illustrating a thermal sensor recessed in a frame of the composting bay.

FIG. 25 is a schematic drawing of a control circuit of the ventilation system.

DETAILED DESCRIPTION OF THE PREFERRED EMBODIMENTS

Figure 1:
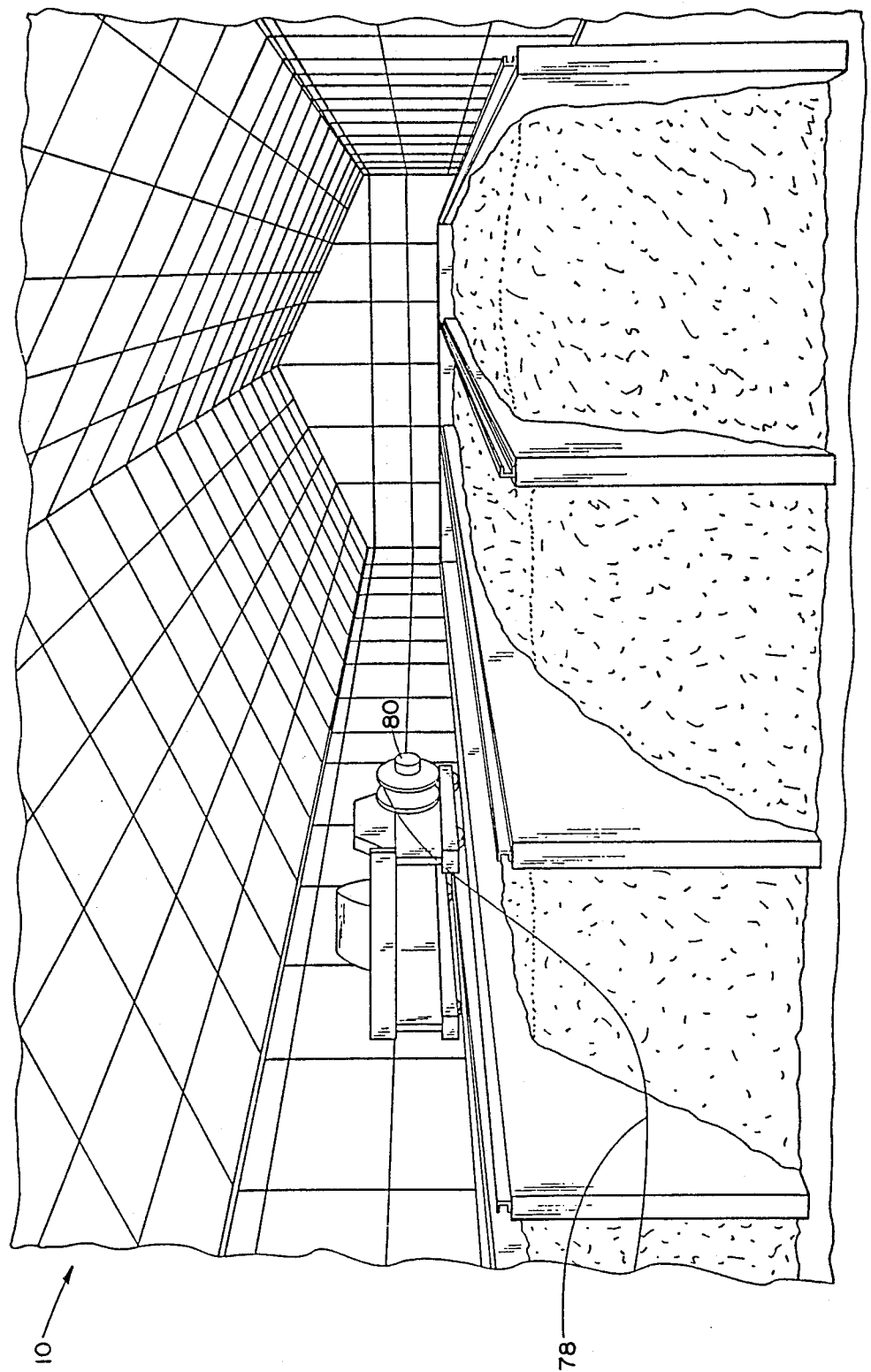
FIG. 1 is a perspective view of a part of a composting facility according to the present invention.

FIGS. 1-4 show composting facility 10 generally comprising a plurality of elongated composting bays 12, 14, 16 and 20, compost handling machine 22, and ventilation system 24, and preferably the composting facility further includes machine transfer dolly 26 and housing or enclosure 30 Generally, composting bays 12, 14, 16 and 20 are provided to receive organic waste material and to hold that material while it composts. Machine 22 is adapted to move along composting bays 12, 14, 16 and 20 to agitate the compost in and to move the compost along those bays, and transfer dolly 26 is employed to transfer the compost handling machine from one composting bay to another. Ventilation system 24 is in communication with the interiors of composting bays 12, 14, 16 and 20 and is provided to selectively conduct air into the compost in those bays to ventilate the compost and to help control the temperature thereof; and housing 30 forms a shelter or covering for composting bays 12, 14, 16 and 20, machine 22, ventilation system 24 and dolly 26.

More specifically, each composting bay 12, 14, 16 and 20 includes a frame defining or bounding an interior of the bay. Preferably, the frame of each composting bay has a U-shaped vertical cross-section; and in particular, each frame includes a bottom floor, and left and right side walls. Also, preferably, bays 12, 14, 16 and 20 are parallel to each other and are located side-by-side with adjacent bays sharing a common wall. Wall 32 forms the left side wall of bay 12, wall 34 forms the right side wall of bay 12 and the left side wall of bay 14, and wall 36 forms the right side wall of the latter bay and the left side wall of bay 16. Wall 38 forms the right side wall of bay 16 and the left side wall of bay 20, and wall 40 forms the right side wall of bay 20. Rails 32a, 34a, 36a, 38a and 40a are secured to and longitudinally extend along the top surfaces of side walls 32, 34, 36, 38 and 40, respectively, to support compost handling machine 22, as discussed in greater detail below. Bays 12, 14, 16, and 20 may be made of any suitable material, although preferably the side walls of the bays are made from concrete or cement, the first ten or twelve feet of the floor of each bay is also made from concrete, and gravel is used to form the rest of the floors of the bays.

Figure 5:
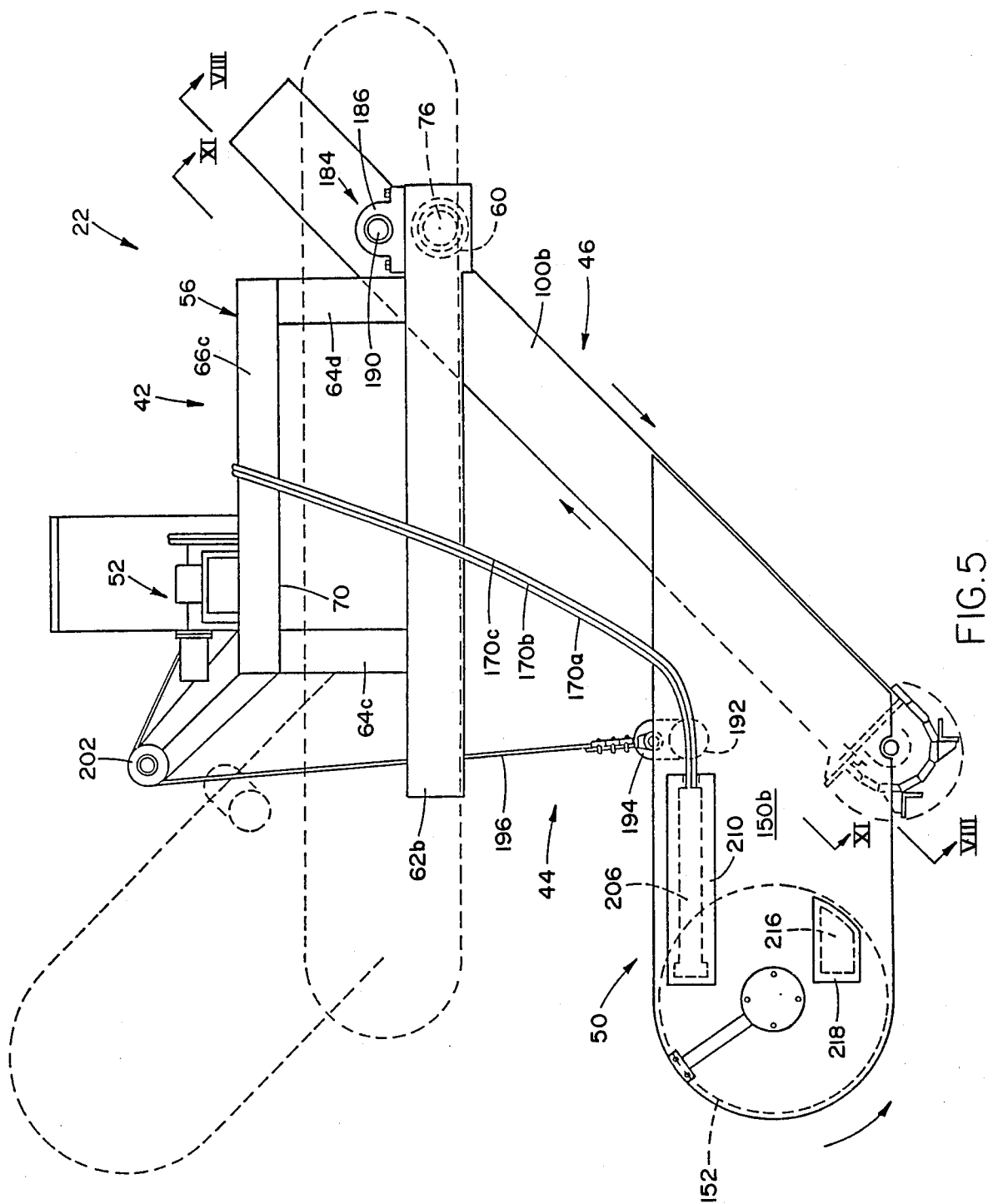
FIG. 5 is a side elevational view of the compost handling machine of the composting facility.
Figure 7:
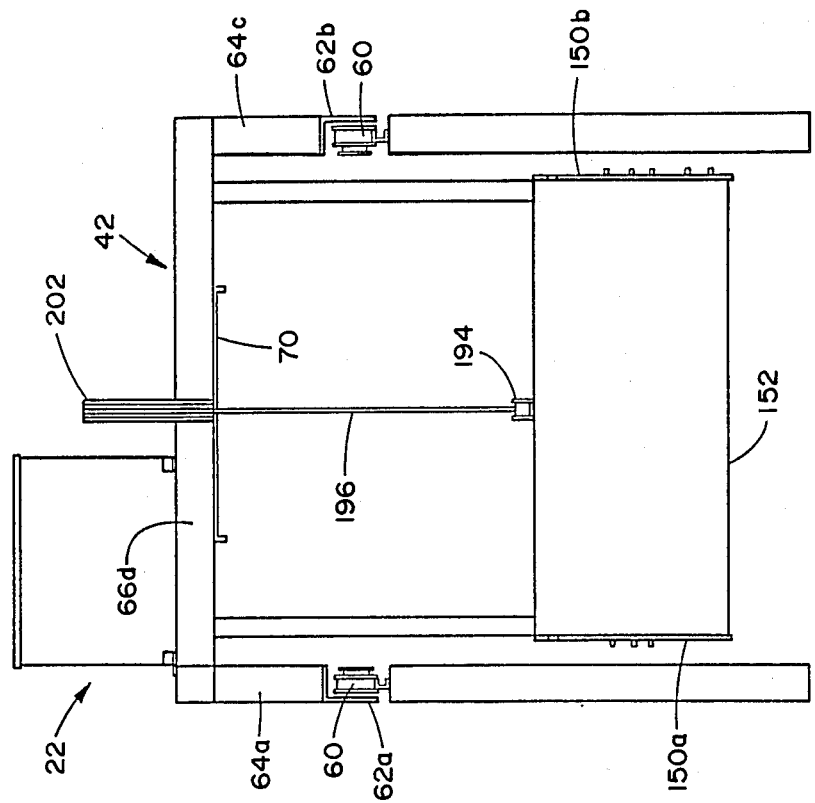
FIG. 7 is a front view of the compost handling machine, showing the machine on a composting bay.
Figure 6:
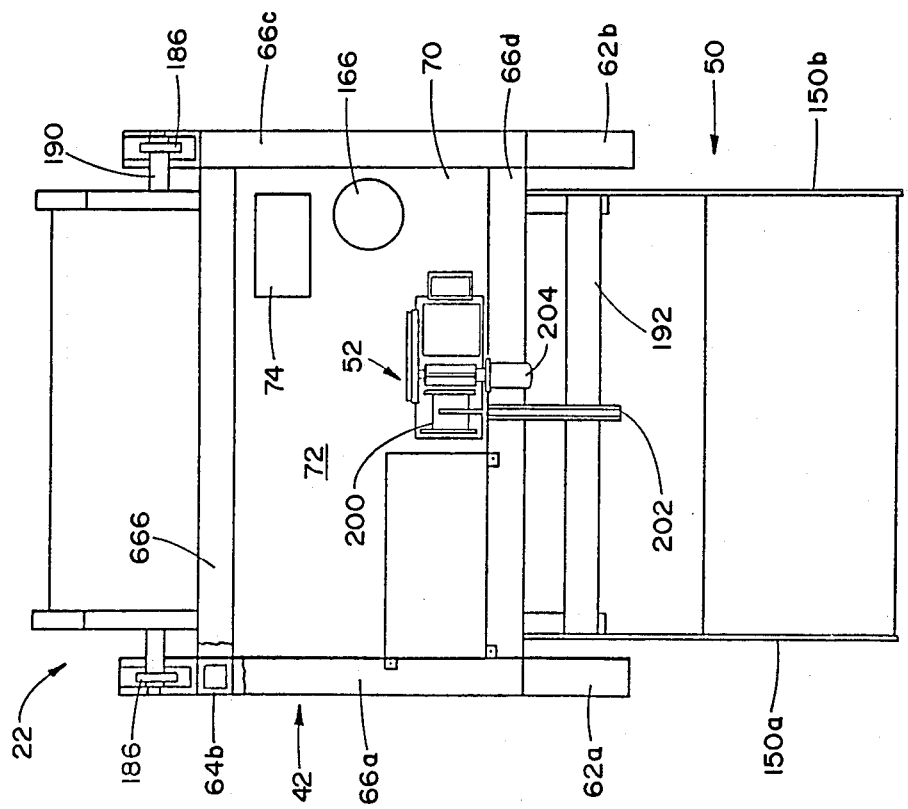
FIG. 6 is a top view of the compost handling machine.

FIGS. 5 through 7 illustrate compost handling machine 22 in greater detail. Generally machine 22 comprises carriage 42 and compost agitating and conveying assembly 44; and assembly 44, in turn, includes conveyor subassembly 46 and drum subassembly 50. Generally, carriage 42 is provided to support machine 22 for movement along composting bays 12, 14, 16 and 20; and assembly 44 is provided to agitate the compost in, and to move the compost along, those composting bays.

Assembly 44 is connected to carriage 42 for movement between a lowered position, shown in full lines in FIG. 5, and a raised position, shown in broken lines in FIG. 5. In its lowered position, assembly 44 extends downward from carriage 42 so that, in use, the assembly will extend into a composting bay to engage the compost therein; and in its raised position, assembly 44 is positioned so that, in use, the entire assembly is above the sides and end walls of the composting bays, facilitating movement of machine 22 onto and off from the composting bays.

Also, when assembly 44 is in its raised position, the whole machine 22 has a relatively compact shape, which simplifies transporting the machine from one location to another, such as from a factory where the machine is made to a composting facility where it is used. Preferably machine 22 further includes means such as winch 52, discussed in greater detail below, to move agitating and conveying assembly 44 between its lowered and raised positions.

More specifically, carriage 42 includes frame 56 and a plurality of wheels 60; and frame 56, in turn, includes bottom longitudinal members 62a and b, vertical posts 64a, b c and d and top horizontal members 66a, b, c and d. Longitudinal members 62a and b generally have an inverted L-shape, and in assembly, these members are spaced apart and parallel to each other and define the width of carriage 42. Vertical posts 64a and b are connected to and extend upward from forward and rearward portions, respectively, of longitudinal member 62a; and posts 64c and d are connected to and extend upward from forward and rearward portions, respectively, of longitudinal member 62b.

Horizontal member 66a is connected to and extends between top ends of posts 64a and b, member 66b is connected to and extends between top ends of posts 64b and d, member 66c is connected to and extends between top ends of posts 64c and d, and member 66d is connected and extends between top ends of posts 64c and a. Plate 70 is connected to and extends between under sides of horizontal members 66a, b, c and d; and this plate, in combination with those horizontal members, forms an equipment bay 72 used to hold various pieces of equipment (discussed below) employed on machine 22. Also, frame 56 may be provided with a plurality of hooks, brackets, or similar members (not shown) that may be used to connect machine 22 to a crane to lift the whole machine and move it from one location to another.

The various members of frame 56 may be made of any suitable material and may be connected together in any suitable way to form a strong, rigid frame for carriage 42. For example, these members may be made from a steel and welded together to form frame 56.

A pair of right wheels 60 are rotatable connected to front and back portions, respectively, of right longitudinal member 62b, and a pair of left wheels 60 (only one of which is shown in the drawings) are rotatably connected to front and back portions, respectively, of left longitudinal member 62b. More particularly, each of members 62a and b includes a vertical flange; and the right wheels of carriage 42 are rotatably connected to and laterally located inside the vertical flange of member 62a, while the left wheels of carriage 42 are rotatably connected to and laterally located inside the vertical flange of member 62b. In use, wheels 60 are mounted on the rails 32a, 34a, 36a, 38a and 40a of bays 12, 14, 16 and 20, and hence preferably these wheels include inside and outside flanges to help hold the wheels on those rails.

A carriage drive motor, schematically represented at 74 in FIG. 6, is mounted on frame 56, specifically in equipment bay 72, and this motor is connected to one or more of the wheels 60 to drive that wheel or wheels. For instance, the back wheels of carriage 42 may be mounted on drive shaft 76, and carriage drive motor 74 may be connected to this drive shaft, via a sprocket-and-chain assembly (not shown) to rotate that shaft 76 and, thereby, drive wheels 60. Preferably, carriage drive motor 74 is an electric motor, and a cable, shown at 78 in FIG. 1, is used to connect the carriage drive motor to an external power source—that is, a power source not on machine 22 itself. Preferably, this cable is wound around a rotatable spool or drum, shown at 80 in FIG. 1, located to the side of frame 56; and as machine 22 moves rearward along a composting bay, the cable is automatically unwound from this drum. Analogously, as machine 22 moves forward on a composting bay, drum 80 is automatically rotated to wind cable 78 around it to prevent the cable from possibly becoming tangled with or inside machine 22 or the composting bay.

With particular reference to FIGS. 8-12, conveyor subassembly 46 includes conveyor frame 82, upper and lower shafts 84 and 86, a plurality of top plate members 88a, b, c and d, a plurality of upper sprockets 90a and b, a plurality of lower sprockets 92a and b, conveyor means 94 and conveyor motor 96. Conveyor frame 82 includes parallel, spaced apart left and right side plates 100a and b, and a plurality of transverse beams 102 connected to and laterally extending between these side plates. The various members of conveyor frame 82 may be made from any suitable material, such as steel, and connected together in any suitable way, such as by welding, to form a strong and sturdy frame for conveyor subassembly 46. Top shaft 84 is rotatably mounted on the top end of conveyor frame 82, via a pair of brackets 104 connected to top ends of side plates 100a and b; and, similarly, bottom shaft 86 is rotatably connected to a bottom end of conveyor frame 82 by means of a pair of brackets 106 connected to bottom ends of side plates 100a and b. Shafts 84 and 86 laterally extends across frame 82 and are parallel to each other.

Plate members 88a, b, c and d are mounted on conveyor frame 82; and the plate members longitudinally extend along the conveyor frame, parallel to each other, and form a top surface of conveyor subassembly 46 to support compost as it is carried upward along that subassembly. More specifically, as viewed in FIG. 8, plate member 88a extends over and laterally inward from the top edge of conveyor frame 82 and member 88d extends over and laterally inward from the bottom edge of the conveyor frame. Also, with reference to FIG. 8, plate member 88b extends upward from the vertical center plane of frame 88a, and member 88c extends downward from the vertical center plane of the conveyor frame to a position slightly spaced from plate member 88d. Each of plate members 88a, b, c and d extends along the entire length of conveyor frame 52, and the top surfaces of the plate members are generally or substantially co-planar. Preferably each plate member 58a, b, c and d includes a top curved section curving around top shaft 84, and a lower curved section curving around bottom shaft 86. A plurality of ribs 108 may be mounted on beams 102 of frame 82 and longitudinally extend along that frame to support, or to help support, plate members 88a, b, c, and d.

Upper sprockets 90a and b are mounted on shaft 84 for rotation therewith, and these sprockets are laterally spaced along that shaft, between side plates 100a and b. Even more specifically, sprocket 90a is laterally located between plate members 88a and b, and sprocket 90b is laterally located between plate members 88c and d. Similarily, sprockets 92a and b are mounted on shaft 86 for rotation therewith, and these sprockets are laterally spaced along that shaft, between plates 100a and b; and even more specifically, sprocket 92a is laterally located between plate members 88a and b, and sprocket 92b is laterally located between plate members 88c and d. Preferably, all the sprockets 90a and b and 92a and b have the same diameter; and moreover, sprockets 90a and b are longitudinally aligned with sprockets 92a and b respectively.

Conveyor means 94 comprises a pair of parallel endless chains 110a and b, and a multitude of lifting plates or cleats 112 connected to those chains. Each chain 110a, b comprises a multitude of connected links, and each lifting cleat 112 is connected by a pair of brackets 114 to a pair of laterally aligned links of the chains. Preferably, each cleat 112 has an L-shaped vertical cross section, and in assembly, the cleat laterally extends over or past both side plates 100a and b of conveyor frame 82. In assembly, chain 110a is mounted on sprockets 90a and 92a, and chain 110b is mounted on sprockets 90b and 92b; and the sprockets support the chains and lifting cleats 112 for movement around a closed path defined by the sprockets.

Conveyor motor 96 is connected to upper shaft 84 to rotate that shaft and upper sprockets 90a and b; and as these sprockets rotate, they pull chains 110a and b and lifting cleats 112 around the above-mentioned closed path. In particular, this movement of sprockets 90a and b causes chains 110a and b and lifting cleats 112 to move upward from sprockets 92a and b to sprockets 90a and b, around the latter sprockets and then back to and around lower sprockets 92a and b. Any suitable motor may be used to drive conveyor means 94, although preferably conveyor motor 96 is a variable speed, hydraulic motor.

With the embodiment of conveyor subassembly 46 illustrated in the drawings, an output shaft of motor 96 is directly connected to shaft 84, and it is not necessary to rigidly connect the conveyor motor to conveyor frame 82. Instead, for example, the necessary reaction forces between frame 82 and motor 96 can be provided by a reaction member 122a that is connected to motor 96 and that, during operation of the motor, engages a reaction plate 122b that is connected to side plate 100b of conveyor frame 82. Also, a second conveyor motor (not shown) may be provided to help drive upper shaft 84, and this second motor may also be a variable speed hydraulic motor connected to shaft 84 in the same way that motor 96 is connected thereto.

FIG. 13 is a schematic drawing of a hydraulic circuit for conveyor motor 96; and, generally, this circuit includes reservoir 124, pump 126 and motor 96. Pump 126 draws hydraulic fluid from reservoir 124 through feed line 130, pressurizes this fluid, and then directs the fluid through high pressure line 132 to motor 96. The high pressure fluid rotates the motor drive shaft, causing sprockets 90a and b to rotate; and from motor 96, the hydraulic fluid is returned to reservoir 124 by means of line 134. Preferably, pump 126 has a variable capacity, and this capacity is varied by any suitable control means to vary the speed of lifting cleats 112 along conveyor frame 82.

In use, conveyor sub assembly 46 is lowered into the compost in a composting bay, and motor 96 is operated to move lifting cleats 112 around sprockets 90a, b and 92a, b. As lifting cleats 112 move around lower sprockets 92a and b, the cleats engage the compost material and carry that material upward and rearward over plate members 88a, b, c and d. As lifting cleats 112 move around upper sprockets 90a and b, the compost material falls downward from the lifting cleats onto or toward the floor of the composting bay. In this way, the compost is both aerated and displaced rearwardly in the composting bay. At the same time, carriage drive motor 74 is operated to drive the whole machine 22 forward on the composting bay so that conveyor assembly 46 passes through all of the compost in that bay, aerating the compost and displacing all of that compost rearwardly in the bay.

During operation of machine 22, occasionally a piece of debris will become lodged in or against one of the conveyor cleats 112 of the conveyor subassembly 46, and hinder or prevent further upward movement of that conveyor cleat. To prevent hydraulic pressure from accumulating in high pressure line 132, which might cause the conveyor cleat to break, the hydraulic control circuit for motor 96 is provided with pressure relief means 136 connected to high pressure line 132 and to reservoir 124 to conduct high pressure fluid back to the reservoir directly from the high pressure line, and thereby by-pass motor 96, when the pressure of fluid in line 132 rises above a preset value.

Preferably, pressure relief means 136 includes by-pass line 140 and control valve 142. Bypass line 140 is connected to high pressure line 132, between pump 126 and motor 96, and to fluid reservoir 124; and control valve 142 is located in by-pass line 140 to control the flow of fluid therethrough. In particular, valve 142 has open and closed positions; and in its open position, the valve conducts fluid from high pressure line 132, through vent line 140 and to reservoir 124; and in its closed position, the control valve directs fluid to motor 96 through high pressure line 132. Control valve 142 is normally held in its closed position, and the valve is connected to high pressure line 132 by pilot line 144 so that the control valve moves from the closed position to its open position when the pressure of fluid in this high pressure line rises above the preset value.

With reference to FIGS. 5 through 7, 14 and 15, drum subassembly 50 includes left and right support arms 150a and b, drum 152, drum connecting means 154 and drum motor 156; and connecting means 154 includes inside support plates 160a and b, shaft 162 and coupling member 164. Generally, left and right support arms 150a and b are connected to conveyor subassembly 46 and extend forward therefrom, and drum 152 laterally extends between and is rotatably supported by those support arms. Motor 156 is connected to one of the support arms 150a or b, extends laterally inward therefrom, is located inside drum 152 and is connected thereto to rotate the drum.

More specifically, left and right support arms 150a and b are connected to and extend forward from left and right side plates 100a and b, respectively, of conveyor subassembly 46, and preferably the drum support arms are parallel to each other. Drum 152 has the shape of a hollow cylinder, defining a central drum axis, and left and right inside support plates 160a and b are connected to the inside surface of the drum and radially extend inward therefrom. As shown in FIGS. 6 and 7, drum 152 laterally extends almost completely between support arms 150a and b, although it is preferred to maintain a small clearance between the drum ad each of the support arms so that the drum does not rub against those support arms as the drum rotates around its axis.

With particular reference now to FIG. 14, support shaft 162 is rotatably supported by a forward portion of left support arm 150a, coaxial with the axis of drum 152. Shaft 162 extends rightward from support arm 150a, and the right end of this support shaft is connected to left support plate 160a, supporting the left side of drum 152 for rotation about its axis. Coupling member 164 is drivingly connected to hydraulic motor 156 and to right support plate 160b; and, in this way, coupling member 164 and motor 156 both rotatably support the right end of drum 152 and also may be operated to rotate the drum about its axis.

Any conventional or suitable hydraulic motor 156 may be used to rotate drum 152, and preferably the drum motor is securely bolted or otherwise connected to the inside surface of support arm 150b. Also, an output shaft of motor 156 may be directly connected to drum support plate 160; although preferably, as shown in FIG. 14, the motor shaft is connected to plate 160b via coupling 164 so that the drum rotates slower than the motor shaft. Motor 156 is driven by a fluid pump, schematically shown at 166 in FIG. 6, and which is located in equipment bay 72 of carriage 42; and pump 166 is connected to the drum motor by suitable hydraulic fluid lines 170a, b and c, discussed in greater detail below.

As shown in FIG. 14, motor 156 is directly connected to right support arm 150b and supports the right end of drum 152 via coupling 164, and the left end of the drum is supported by shaft 162. As will be understood by those skilled in the art, this relationship may be reversed, and motor 156 may be connected to left support arm 150a and support the left end of drum 152, while a support shaft may be used to support the right end of the drum. Further, it is not necessary that motor 156 be used to help support drum 152; and drum 152 may be supported independent of drum motor 156, while the motor is drivingly connected either to the drum or to a support shaft therefor to rotate the drum. Alternatively, for certain applications, it may be desirable to use two motors to drive drum 152, and a first of these motors also may be used to support the right end of the drum, as motor 156 does, while the second of these motors may be used in an analogous manner to support the left end of the drum.

FIG. 16 is a schematic drawing of a hydraulic circuit for drum motor 156; and, generally, this circuit includes reservoir 172, pump 166, and motor 156. Pump 166 draws hydraulic fluid from reservoir 172 through feed line 176, pressurizes this fluid, and then directs the fluid through high pressure line 180 to motor 156. The fluid rotates the motor shaft, causing drum 152 to rotate about its axis; and from motor 156, the hydraulic fluid is vented to reservoir 172 via return line 182. Preferably, pump 166 has a variable capacity, and this capacity is varied by any suitable control means to vary the rotational speed of drum 152. A third fluid line, referred to as a case drain line (not shown in FIG. 16), is connected to drum motor 156 to drain to reservoir 172 any hydraulic fluid that might leak into the drum motor case from the working path of the hydraulic fluid.

Drum 152 is provided with a multitude of tiller teeth (not shown) that extend outward from the drum and that are axially and circumferentially spaced over the outside circumferential surface of the drum. In use, drum 152 is lowered with conveying assembly 46 into the compost in a composting bay, and the drum is rotated about its axis to mix and comminute the compost in the bay. One or more portions of drum 152, for instance as shown at 152a in FIGS. 14 and 15, may be releasably connected to the main portion of the drum to selectively provide access to the interior of the drum, for instance, to help maintain drum motor 156.

With particular reference to FIGS. 5 and 6, connecting means 184 connects agitating and conveying assembly 44 to carriage 42 for movement between the above-mentioned lowered and raised positions of assembly 44, and this connecting means includes brackets 186 and support shaft 190. Brackets 186 are secured to and extend upward from end sections of longitudinal members 62a and b of frame 56, and shaft 190 is supported by and laterally extends between these brackets 186. Shaft 190 also extends through side plates 100a and b of conveyor frame 82, supporting those plates, and the entire assembly 44 for pivotal movement about the axis of shaft 190, between the lowered and raised positions of the compost agitating and conveying assembly 44.

A conventional, electrically operated winch 52 may be used to move assembly 44 between its lowered and raised positions. More specifically, shaft 192 is securely connected to and laterally extends between drum support arms 150a and b, and bracket 194 is securely connected to this shaft. Cable 196 is secured to winch drum 200; and cable 196 extends from drum 200, around pulley 202, and is connected to bracket 194. A conventional, reversible electric motor 204 is drivingly connected to winch drum 200 to rotate that drum selectively to wind cable 196 onto, or to unwind the cable from, the winch drum.

To move assembly 44 from its lowered position to its raised position, motor 204 is actuated to wind cable 196 around drum 200, pivoting assembly 44 about shaft 190 and into its raised position. Releasable connecting means (not shown) may be used to lock assembly 44 to carriage 42 while the assembly 44 is in its raised position. To move assembly 44 from this raised position to its lowered position, any such releasable connecting means is released to unlock assembly 44 from carriage 42; and then motor 204 is actuated to unwind cable 196 from drum 200, allowing assembly 44 to pivot downward under its own weight about shaft 190.

In accordance with the present invention, machine 22 is provided with a drum 152 having a diameter considerably larger than the diameters of drums used with prior art machines of the same general type. This larger drum can be adequately supported by arms 150a and b by forming those arms from a substantially solid material. With particular reference to FIGS. 5 and 17–19, in order to conduct hydraulic fluid lines 170a, b and c from pump 166 to motor 156, an elongated opening 206 is formed in right support arm 150b, longitudinally extending forward to a position laterally projecting inside drum 152; and hydraulic fluid lines 170a, b and c are passed through this opening, from a location laterally outside arm 150b to a position inside the drum, and therein connected to motor 156.

Figure 17:
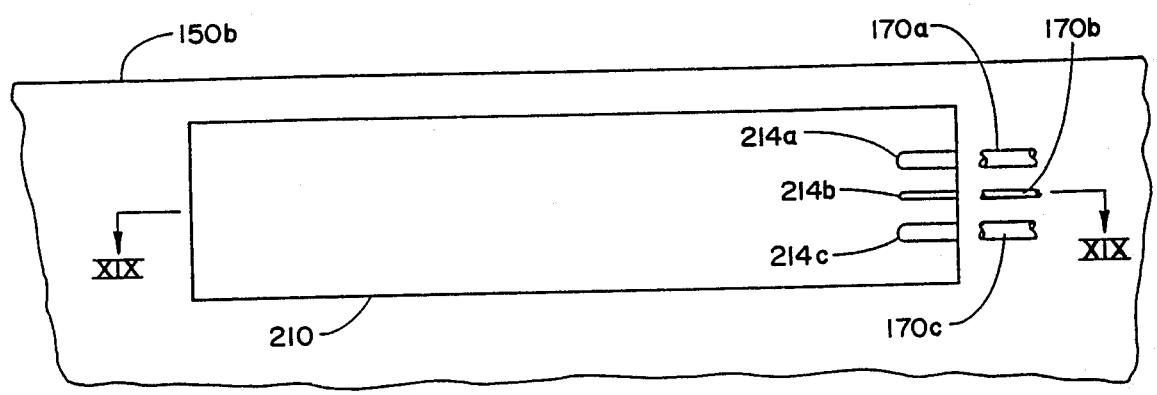
FIG. 17 is an enlarged view of a portion of the outside surface of one of the drum support arms of the compost handling machine.
Figure 18:
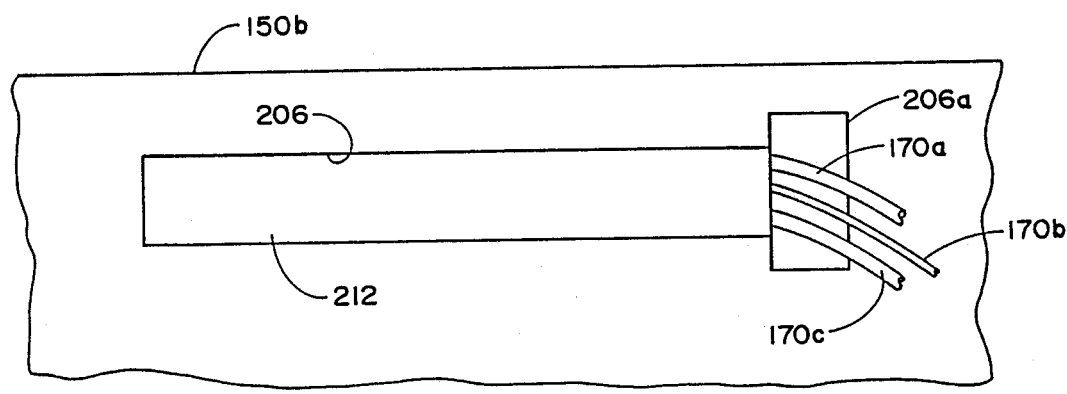
FIG. 18 is an enlarged view of the inside surface of the portion of the support arm shown in FIG. 17.
Figure 19:
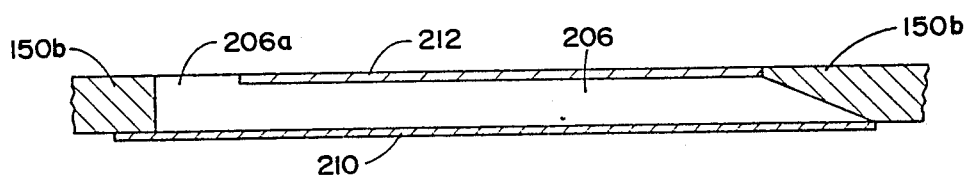
FIG. 19 is a cross-sectioned view taken along line XIX—XIX of FIG. 17.

To reinforce arm 150b around opening 206, outside cover plate 210 is located over that opening and connected to an outside surface of the right support arm, and inside cover plate 212 is placed in opening 206 and also connected to the right support arm. Preferably, outside cover plate 210 extends completely over opening 206; and, as shown in FIG. 17, through slots 214a, b and c are formed in the outside cover plate to allow fluid lines 170a, b and c to pass into the elongated opening 206 of support arm 150b. In contrast, inside plate 212 does not extend completely over opening 206 and this plate and arm 150b form a small, forward outlet 206a, and fluid lines 170a, b and c pass outwardly from opening 206 through this outlet. With the embodiment of the invention illustrated in the drawings, outside cover plate 210 is releasably connected to arm 150b, and for example, this cover plate may be bolted to the support arm; and inside cover plate 212 is permanently secured, for example, by welding, to support arm 150b. In addition, preferably, the back edge of opening 206 slants rearwardly outwardly, decreasing the amount of material that must be removed from arm 150b to form the through opening.

Figure 20:
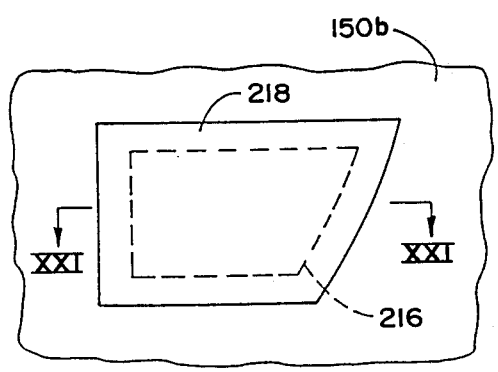
FIG. 20 is an enlarged view of another portion of one of the drum support arms.
Figure 21:
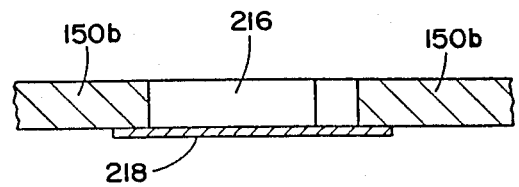
FIG. 21 is a cross-sectional view taken along line XXI—XXI of FIG. 20.

As previously mentioned, preferably the lateral ends of drum 152 are slightly spaced from support arms 150a and b; and during operation of machine 22, small amounts of waste material and compost will pass into the interior of drum through these spaces between the drum and its support arms 150a and b. It is desirable to remove this accumulated material occasionally, and each support arm 150a and b is provided with a through opening to provide access to the interior of drum 152 through the support arm to facilitate removing debris from within the drum. One of these access openings is shown at 216 in FIGS. 5, 20 and 21; and this opening extends to a position laterally projecting inside drum 152, and preferably is located at a level below and rearward of the axis of the drum. An analogous opening (not shown) may be formed in left support arm 150a. Cover plates, one of which is shown at 218 in FIGS. 5, 20 and 21, are provided to releasably cover the above-mentioned access openings, to reinforce arms 150a and b in the area of these openings and to prevent material and debris from passing inward through those openings while drum 152 is operating within a composting bay. Each of these cover plates 218, preferably, has a relatively flat shape and is releasably connected to a respective support arm via a plurality of bolts.

With reference back to FIG. 3, transport dolly 26 is provided to transfer composting handling machine 22 from one composting bay to another bay; and dolly 26 is located immediately forward of the front ends of bays 12, 14, 16 and 20, and is supported for lateral movement across those front ends. Generally, dolly 26 comprises a support frame 222 and a pair of top rails 224a and b. Frame 222 may be constructed in any acceptable manner, and rails 224a and b are connected to the dolly frame and are supported thereby at the level of rails 32a, 34a, 36a, 38a and 40a of compost bays 12, 14, 16 and 20. The rails 224a and b of transport dolly 26 are parallel to each other and are spaced apart the same distance as the rails 32a, 4a, 36a, 38a and 40a of the composting bays; and, thus, dolly 26 may be moved across the composting bays so that, at different times, dolly rails 224a and b are aligned with the rails 32a and 34a, with rails 34a and 36a, with rails 36a and 38a, and with rails 38a and 40a.

Dolly 26 is supported in any suitable manner for movement across the front ends of composting bays 12, 14, 16 and 20. For instance, a pair of rails 226a and b may be located forward of bays 12, 14, 16 and 20, extending perpendicular to the longitudinal axes thereof, and dolly frame 222 may include a plurality of bottom wheels (not shown) that are mounted on and guided by these rails 226a and b for movement across the front ends of the composting bays. A suitable motor (not shown) may be connected to the dolly wheels to drive those wheels and to move dolly 26 along rails 226a and b.

To move the compost handling machine 22 from bay 12 to bay 14, for example, dolly 26 is located in a first position, wherein rails 226a and b are aligned with rails 32a and 34a, respectively. Then, compost agitating and transporting assembly 44 of machine 22 is moved to its raised position, and machine 22 is moved along rails 32a and 34a and onto dolly rails 224a and b. Once machine 22 is secured on dolly 26, the dolly is moved along rails 226a and b to a second position where the dolly rails 224a and b are aligned with rails 34a and 36a, and then machine 22 is moved off the dolly rails and onto rails 34a and 36a. Machine 22 is moved along rails 34a and 36a to the back end of bay 14, and then assembly 44 is lowered into the compost in the bay. Machine 22 is then moved forward along bay 14 to agitate the compost therein and to move that compost rearwardly; and once machine 22 reaches a position adjacent the front end of bay 14, the machine is moved, in a manner analogous to that described above, from bay 14 to bay 16, and subsequently, from the latter bay to bay 20.

Preferably, the movement of machine 22 and dolly 26 along and between bays 12, 14, 16 and 20 is controlled automatically, in a manner described in greater detail below. However, the desired movement of machine 22 and dolly 26 may be controlled semi-automatically or manually. It may be preferred to extend rails 226a and b to the left of bay 12, to the right of bay 20, or both, so that dolly 26 can be moved to a position laterally to the side of all of the composting bays and in which the dolly does not interfere with loading material into those bays. Also, stops (not shown) may be located at the ends of rails 226a and b to help prevent dolly 26 from rolling off those rails.

Ventilation system 24 is in communication with the interiors of composting bays 12, 14, 16 and 20 and is provided to selectively conduct air into the compost in those bays to ventilate the compost and to help control the temperature thereof. Preferably, the temperature of the compost varies along the length of each bay, and ventilation system 24 includes a multitude of sensors, schematically shown at 252 in FIG. 2, to actuate the ventilation system to conduct air selectively into different sections of the composting bays to maintain desired compost temperature profiles With the preferred embodiment of the invention illustrated in the drawings, each bay 12, 14, 16 and 20 includes a plurality of, specifically five, sections referenced as a, b, c, d and e, respectively; and ventilation system 24 comprises a multitude of subsystems 24a–t, with each subsystem adapted to conduct air into a respective one of the bay sections.

These bay sections do not overlap, and they may be slightly spaced from each other. Thus, the first or "a" section of each bay comprises a forward portion of the bay and extends for a first preset length, and the second or "b" section of the bay is located rearward of the first section of the bay and extends for a second preset length. Similarly, the third or "c" section of each bay is located rearward of the second section of the bay and extends for a third preset length, the fourth or "d" section of the bay is located rearward of the third section of the bay and extends for a fourth preset length, and the fifth or "e" section of the bay is located rearward of the fourth section of the bay and extends for a fifth preset length. Also, in practice, it has been found that it may be unnecessary to ventilate the first few feet and the last few of each bay.

For instance, with one embodiment of the invention that has actually been reduced to practice, the first ventilated section of each bay starts about twenty-five feet rearward of the front of the bay itself and is about twenty-five feet long, and the second section of each bay is also about twenty-five feet long. The third and fourth sections of each bay are each about thirty-five feet long, and the fifth section of each bay is also about thirty-five feet long and terminates about five feet before the end of the bay.

Ventilation subsystems 24a–e are provided to ventilate the compost in bay sections 12a–e respectively; and ventilation subsystems 24f–j are provided to ventilate the compost in bay sections 14a–e respectively. Analogously, ventilation subsystems 24k–o are provided to ventilate the compost in bay sections 16a–e respectively; and ventilation subsystems 24p–t are provided to ventilate the compost and bay sections 20a–e respectively.

The ventilation subsystems 24a–t are very similar to each other; and only one, subsystem 24a, will be described in detail. With particular reference to FIGS.

22-24, subsystem 24a includes blower 254, feed line 256, header 260, a multitude of distribution lines 262, and sensor 252. Blower 254 is employed to selectively supply a source of air; and in particular, blower 254 has an actuated state, wherein it operates to provide the source of air, and an unactuated state, wherein the blower is not operating. Preferably, blower 254 includes a motor 264 that is used to operate or drive the blower; and motor 264 is actuated and deactivated, respectively, to actuate and deactuate blower 254. Any suitable fan blower, including any suitable motor, may be used in ventilation system 24a, although, preferably, blower motor 264 is an electrically operated motor.

Feed line 256 is connected to blower 254 to receive air therefrom; and feed line 256 extends from blower 254 into bay section 12a, specifically the floor thereof. Header 260 is located in bay section 12a and is connected to feed line 256 to receive air therefrom. Preferably, header 260 is located within the floor of bay section 12a and extends parallel to the longitudinal axis of the bay, along or closely adjacent side wall 32, and preferably line 256 is connected to header 260 about midway between the ends of the header. Distribution lines 262 are connected to header 260 to receive air therefrom, and the distribution lines extend from the header across bay section 12a. Each distribution line has a multitude of top outlets 262a in communication with the interior of bay section 12a to discharge air thereinto from the distribution line. Preferably, distribution lines 262 are parallel to each other, laterally extend across bay 12 and are uniformly spaced apart along the entire length of bay section 12a; and, for instance, lines 262 may be spaced two feet apart over this bay section.

When blower 254 is activated, the blower forces air into feed line 256, and the air is then conducted through that line and into and through header 260. Header 260 conducts the air to distribution lines 262, and air is discharged from these lines into the compost in bay section 12a via outlets 262a. Preferably, the top surfaces and outlets of distribution lines 262 are located at or slightly below the top level of the floor of bay section 12a. Moreover, it is preferred to keep the size of outlets 262a relatively small to prevent gravel and other debris from falling into lines 262 through these outlets, and, for instance, outlets 262a may have a circular shape with a diameter of about one-quarter inch.

Sensor 252 of ventilation subsystem 24a is located in bay section 12a to sense the temperature of compost therein and to actuate ventilation subsystem 24a to conduct air into the compost when the temperature thereof rises above a preset value. Preferably, as shown in FIG. 24, the frame of bay 12, specifically, side wall 32 thereof, defines a recess 266 extending outwardly from the interior of the bay, and sensor 252 is located in that recess. With this preferred arrangement, plate 268 is releasably connected to the frame of bay 12, specifically, side wall 32 thereof, to hold sensor 252 in recess 266 and to keep the compost out of that recess. To help insure that sensor 252 is in good thermal communication with the compost in bay section 12a, plate 268 may be made of a material having good thermal conductivity and the sensor may be held against and securely connected to that plate. Furthermore, recess 266 may be filled with a thermally insulating material 272 to help insulate sensor 252 from heat generated outside of composting bay 12, and preferably plate 268 does not touch side wall 3 to inhibit the transfer of heat therefrom to sensor 252 via plate 268.

Sensor 252 may be used to control the operation of ventilation subsystems 24a in any suitable way, and FIG. 25 is a schematic diagram showing one such control arrangement. Preferably, sensor 252 is a thermocouple which produces an electric output current having a magnitude dependent on the temperature of the sensor; and this current is conducted to a control member 274, which compares that current to a set point value When the magnitude of the current from sensor 252 rises above that set point, control member 274 generates a control signal that is conducted to and actuates fan blower motor 264, and this motor operates fan 254 to provide air to bay section 12a. Preferably, the abovementioned set point value is manually adjustable, allowing an operator to vary the temperature of the compost in bay section 12a at which ventilation subsystem 24a is actuated. Moreover, preferably control member 274 is a microprocessor programmed in any suitable way to receive input data from sensor 252 and manual input to adjust the set point value, and to actuate motor 264 when the temperature of the sensor rises above that set point value.

Figure 2:
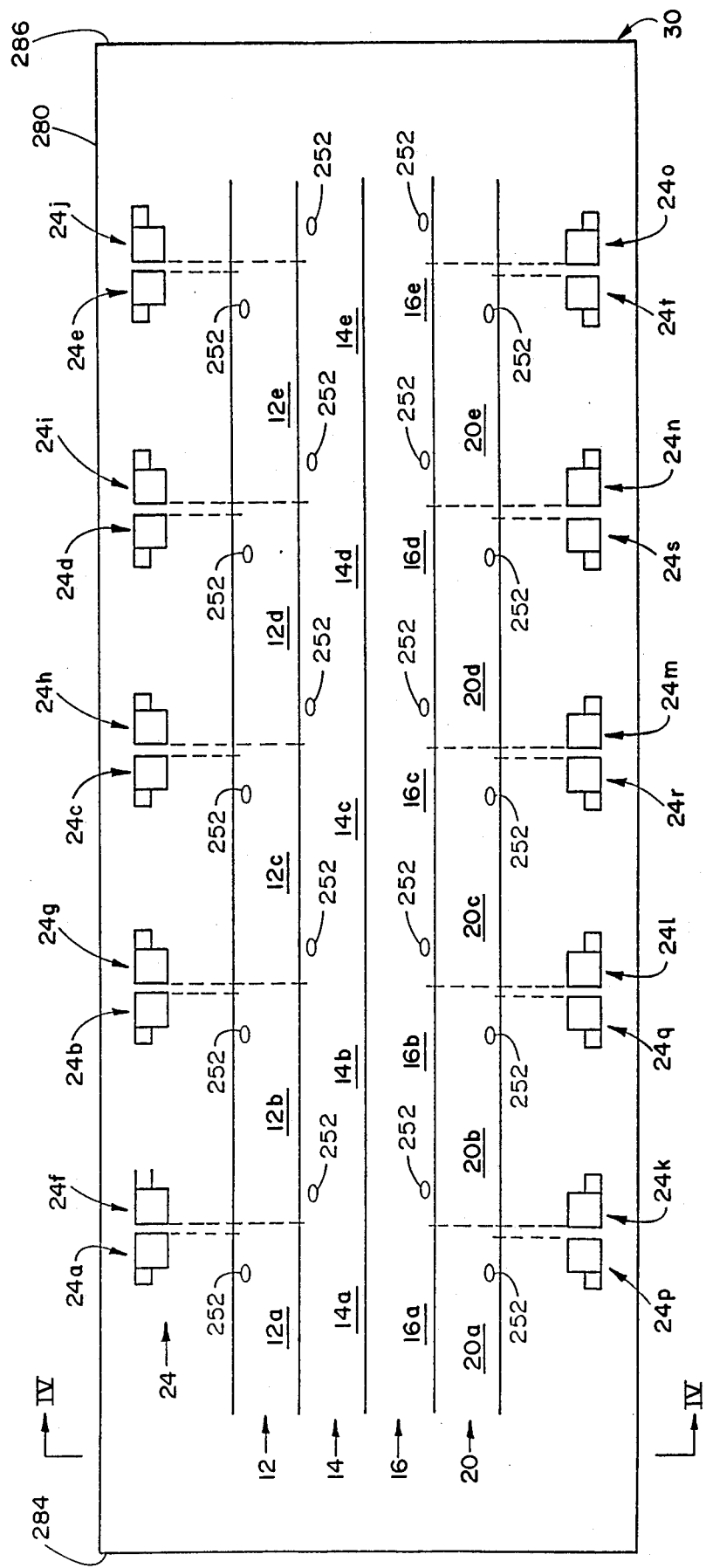
FIG. 2 is a plan view generally showing the outline of the composting facility.

With reference to FIG. 2, preferably the feeder line of each ventilation subsystem enters the respective bay section about midway along the length of that bay section, and the feeder lines to the "a," "b," "c," "d," and "e" sections of interior bays 14 and 16 pass below the feeder lines to the corresponding sections of outside bays 12 and 20. Thus, for instance, the feeder line to bay section 14a extends parallel to and approximately directly below the feeder line to bay section 12a.

As previously mentioned, the subsystems 24a-t are generally very similar. However, preferably the temperature of the compost in each composting bay is allowed to vary along the longitudinal direction of the bay, and thus the sensors of the different ventilation subsystems actuate those subsystems at various temperatures. Also, advantageously, the set point of each sensor 252 can be independently, manually adjusted, and all of the ventilation subsystems 24a-t employ a common microprocessor 274 to receive the input signals from the various sensors of the ventilation subsystems and to actuate the fan motors thereof.

The preferred temperature variation of the compost in each bay depends on a number of factors, such as the moisture content of the compost and the type of organic waste in the compost. By controlling the temperature and aeration of the compost, microbial activity during the composting process can be increased to decrease the time required to produce the desired end product. For example, under certain conditions, it may be preferred to maintain the temperature of the compost in the first, second, third, fourth and fifth section of each composting bay, respectively, at 40° C., 56° C., 56° C., 45° C. and 40° C.

With this preferred temperature distribution, the sensors of subsystems 24a, f, k and p actuate those ventilation subsystems when the temperature of the compost in bay sections 12a, 14a, 16a and 20a, respectively, rises above 40° C.; and the sensors of ventilation subsystems 24b, g, l and q arcuate those subsystems when the temperature of the compost in bay sections 12b, 14b, 16b and 20b, respectively, rises above 56° C. Analogously, sensors of subsystems 24c, h, m and r actuate those ventilation subsystems when the temperature of the compost in bay sections 12c, 14c, 16c and 20c, respectively, rises above −56° C.; the sensors of ventilation subsystems 24d, i, n and s actuate these subsystems when the temperature of the compost in bay sections 12d, 14d, 16d and 20d, respectively, rises above 45° C.; and the sensors of subsystems 24e, j, o and t actuate these subsystems when the temperature of the compost in bay sections 12e, 14e, 16e and 20e, respectively, rises above 40° C.

As will be appreciated by those of ordinary skill in the art, it is not necessary that composting facility 10 include four composting bays, and the system may be provided with one or more bays. Further, the specific dimensions of the composting bays are not critical, although with one embodiment of the invention that has been actually reduced to practice, each composting bay is approximately 180 feet long and the interior of the bay is about five and one-half feet deep and five and one-half feet wide. Likewise, it is not necessary that five ventilation subsystems be used to ventilate the compost in each bay, and one or more ventilation subsystems may be used with each bay. The specific number of ventilation subsystems used with a particular bay is determined principally by the extent to which it is desired to exercise control over the temperature of the compost along the length of the composting bay.

Moreover, it is not necessary that each ventilation subsystem be provided with its own blower, and a single blower may be used to provide air for a plurality, or for all, of the ventilation subsystems. For instance, one common blower may be used to provide air for ventilation subsystems 24a–e. If this is done, valves may be located in that common blower or in the feed lines of the ventilation subsystems 24a–e to control air flow through those subsystems, and in particular so that air may be directed into each of the bay sections 12a, b, c, d and e independent of whether air is also being conducted into any other of the bay sections.

Figure 4:
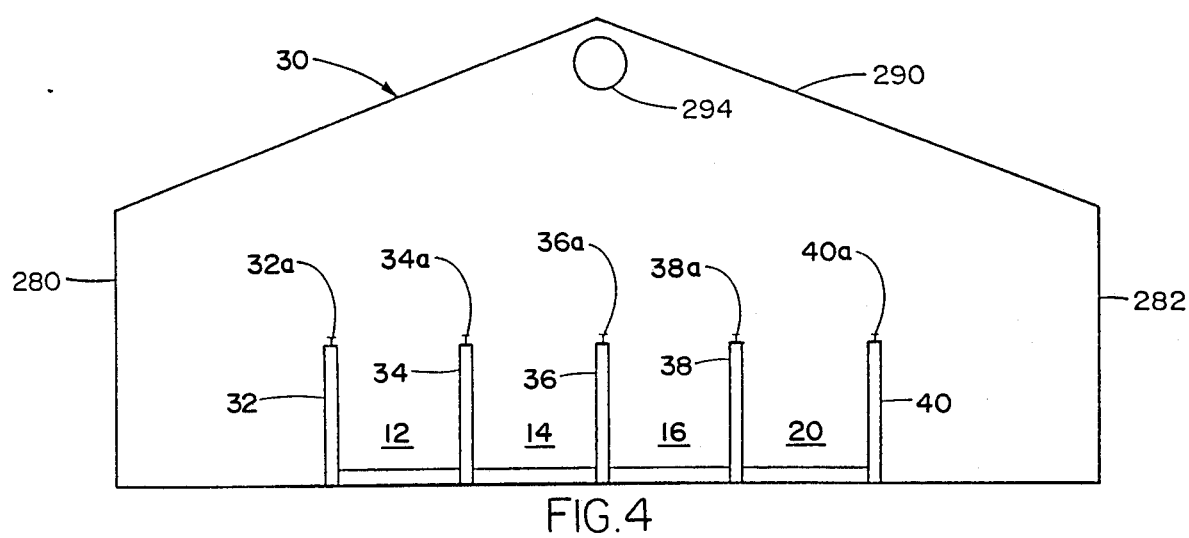
FIG. 4 is a front view of the composting facility, taken along line IV—IV of FIG. 2.

With particular reference to FIGS. 2 and 4, housing 30 is provided to enclose composting bays 12, 14, 16 and 20, machine 22, ventilation system 24 and transfer dolly 26; and preferably, the housing includes left and right sidewalls 280 and 282, front and back walls 284 and 286, and roof 290, which are connected together to enclose completely bays 12, 14, 16 and 20, machine 22, ventilation system 24 and transfer dolly 26. Suitable door means (not shown) are provided to allow personnel and equipment to move into and out of housing 30. Also, a ventilation system may be provided to collect gases and vapors from within housing 30 and to discharge those gases and vapors into the atmosphere outside the housing. Preferably, this ventilation system includes a duct 294 located above composting bays 12, 14, 16 and 20 and that is provided with a plurality of inlet openings to collect gases and vapors. Duct 294 may be located closely adjacent roof 290 of housing 30 and extend therealong, parallel to the longitudinal axes of the composting bays. A fan (not shown) may be used to draw gases and vapors into vent duct 294; and one or more filters may be located in the vent duct, or elsewhere in the associated ventilation system, to filter the gases and vapors prior to their being discharged into the atmosphere.

Figure 26:
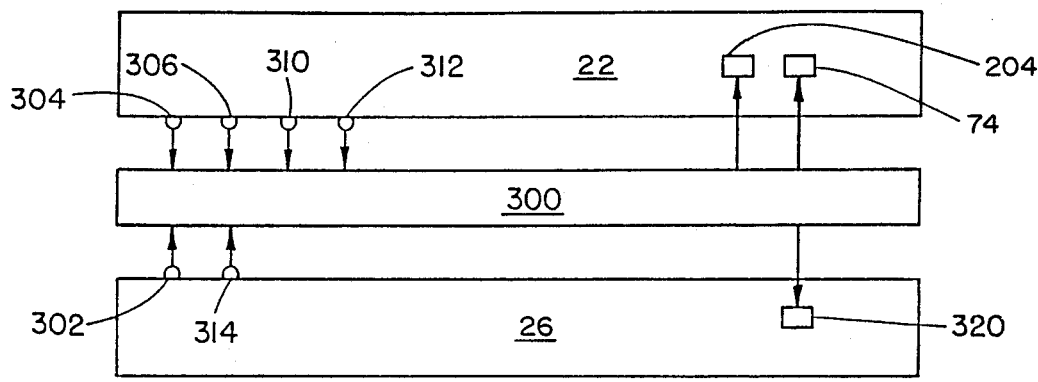
FIG. 26 is a schematic drawing of a control circuit for the compost handling machine and the transfer dolly of the composting facility.

As previously mentioned, preferably compost handling machine 22 is automatically moved through a daily routine to aerate and displace the compost in composting bays 12, 14, 16 and 20; and facility 10 is provided with a plurality of switches and with a system control means to sense the position of machine 22 and dolly 26 at various locations on and about the composting bays, and to move the compost handling machine automatically through the desired operation. FIG. 26 schematically illustrates such system control means, referenced as 300, and such switches, referenced as 302, 304, 306, 310, 312 and 314 and FIG. 26 also schematically shows compost handling machine 22, transfer dolly 26, winch motor 204, carriage drive motor 74, and dolly motor 320.

Generally, switch 302 is actuated to generate a first control signal when dolly 26 is directly forward of any one of the composting bays 12, 14, 16 or 20, and switch 304 is actuated to generate a second control signal when compost handling machine 22 is on a resting position on dolly 26. Switch 306 is actuated to generated a third control signal when compost handling machine 22 is adjacent the back end of any one of composting bays 12, 14, 16, and 20, and switch 310 is actuated to generate a fourth control signal when the composting handling machine is adjacent the front end of any one of the composting bays.

Switch 312 is actuated to generate a fifth control signal when compost agitating and conveying assembly 44 of machine 22 moves into the lowered position, and to generate a sixth control signal when assembly 44 moves into the raised position, and switch 314 is actuated to generate a seventh control signal after the compost handling machine has moved through all four of the composting bays. System control means 300 is connected to switches 302, 304, 306, 310, 312, and 314 to receive the above-mentioned control signals therefrom; and system control means 300 is connected to dolly motor 320, carriage motor 74, and winch motor 204 to actuate and deactuate those motors selectively to move the compost handling machine and the dolly through the desired routine.

Figure 27:
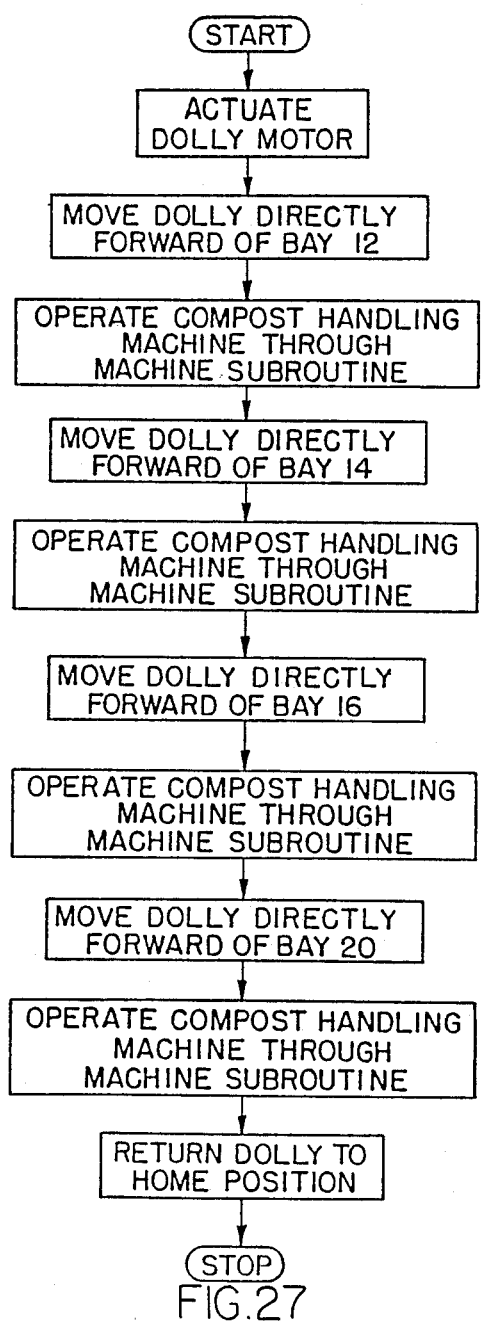
FIG. 27 is a flow chart illustrating the daily routine for the transfer dolly.
Figure 28:
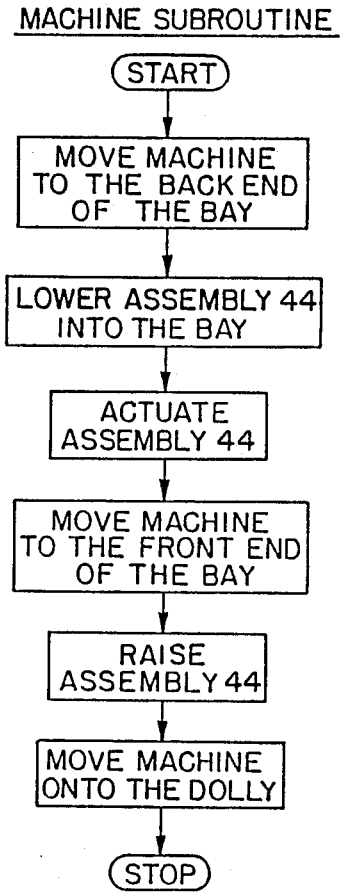
FIG. 28 is a flow chart showing a routine for the compost handling machine.

FIGS. 27 and 28 are flow charts that illustrate this desired routine; and, more specifically, FIG. 27 generally outlines the procedure for moving dolly 26 from one composting bay to another composting bay, while FIG. 28 outlines the procedure for moving composting handling machine 22 along each composting bay.

Figure 3:
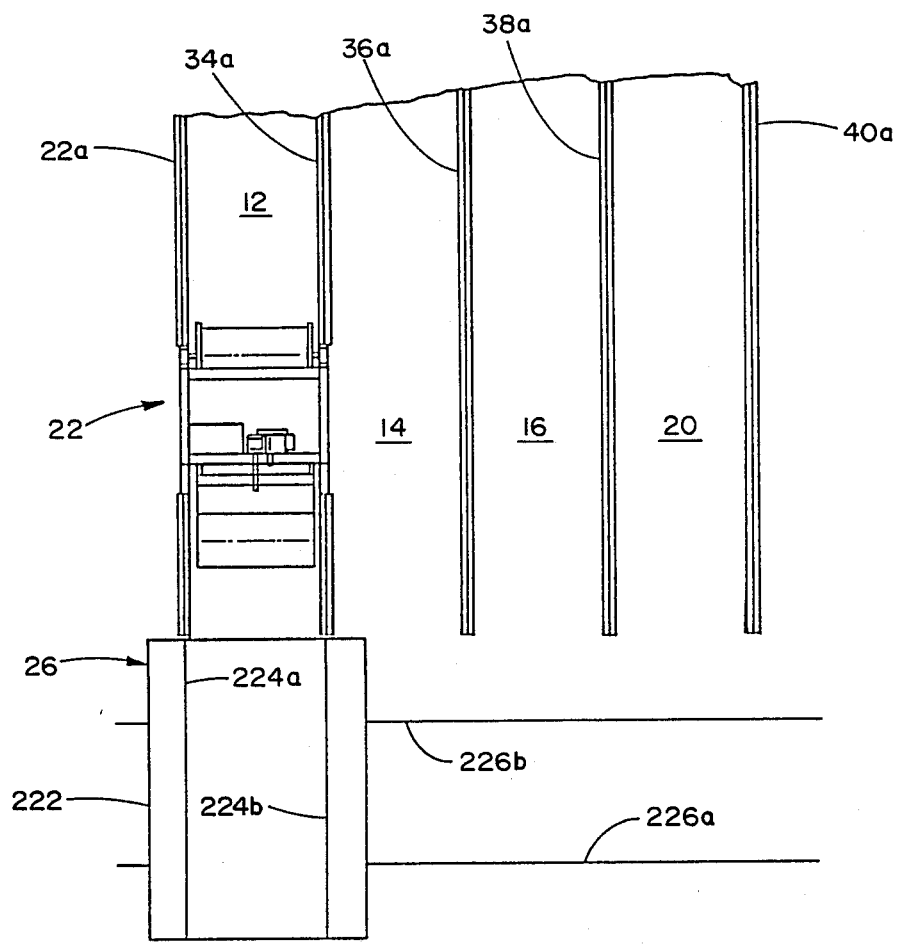
FIG. 3 is an enlarged plan view of a portion of the composting facility, and showing a compost handling machine and a transfer dolly for that machine.

With particular reference to FIGS. 3 and 26–28, at the start of the routine, compost handling machine 22 is resting on transport dolly 26, and that dolly is resting in a start or home position that preferably, as viewed in FIG. 3, is just to the right of being directly forward of composting bay 12. Each day, at a selected time determined by a timer (not shown) a start signal is generated, and dolly drive motor 320 is actuated to move dolly 26 to the left as viewed in FIG. 3. When the dolly reaches a position where it is directly forward of bay 12 and dolly rails 224a and b are aligned with rails 32a and 34a, respectively, an arm (not shown) on the composting bay actuates limit switch 302.

When this happens, dolly drive motor 320 is deactuated, and carriage drive motor 74 is actuated to drive compost handling machine 22 off dolly 26, onto rails 32a and 34a and to the back end of composting bay 12. The actuation of limit switch 302 may also be used to start pumps 126 and 166 to increase the fluid pressure in fluid lines 132 and 180 respectively. When compost handling machine 22 reaches a pre-selected position adjacent the end of composting bay 12, an arm (not shown) on the bay actuates limit switch 306. When this switch 306 is actuated, carriage drive motor 74 is deactuated, stopping movement of compost handling machine 22 at or near the end of bay 12, and winch motor 204 is actuated to lower compost agitating and conveying assembly 44 into the compost in the composting bay.

Switch 312 is located on shaft 190; and when assembly 44 reaches a predetermined position in composting bay 12, this switch 312 is actuated. In response to this, first, winch motor 204 is deactuated so that assembly 44 is held in that predetermined position; and second, drum and conveyor motors 156 and 96 are actuated. Drum 152 begins to rotate about the drum axis, agitating the compost in bay 12; and conveyor means 94 begins to move around sprockets 90a, b and 92a, b so that lifting cleats 112 carry the compost material upward and rearward in the composting bay.

A few seconds after the drum and conveyor motors are actuated, carriage motor 74 is actuated to drive carriage wheels 60 and move composting handling machine 22 forward on rails 32a and 34a. As machine 22 moves forward on those rails, drum 152 continues to rotate in the compost to agitate that compost, and conveying means 94 continues to move around sprockets 90a, b and 92a, b to move the compost rearward in composting bay 12. When compost handling machine 22 reaches a predetermined position at or near the front of bay 12, an arm (not shown) on the bay actuates switch 310; and, when this happens, carriage motor 74 is deactuated, stopping further forward movement of machine 22, and winch motor 204 is actuated to move assembly 46 to the raised position. When assembly 46 reaches this position, the previously mentioned switch 312 is actuated, and when this occurs, winch motor 204 is deactuated and carriage motor 74 is reactuated to drive machine 22 onto dolly 26.

Once compost handling machine 22 reaches a preset position securely on dolly 26, an arm (not shown) on that dolly actuates switch 304; and in response to this, carriage motor 74 is deactuated and dolly motor 320 is actuated to move the dolly to the right as viewed in FIG. 3. Dolly 26 continues to move this way until it is directly forward of bay 14 and dolly rails 224a and b are aligned with rails 34a and 36a respectively. When dolly 26 reaches this position, an arm (not shown) on composting bay 14 actuates switch 302, deactuating motor 320 and actuating carriage drive motor 74 so that compost handling machine 22 moves from the dolly and onto rails 34a and 36a.

Machine 22 is then moved along bay 14 in the same way it was moved along bay 12; and once composting handling machine 22 is finished agitating and conveying the compost in bay 14, the machine is transferred to bay 16 from bay 14 in the same way in which it was moved to bay 14 from bay 12. Machine 22 is then moved along bay 16 in the same way it was moved along bays 12 and 14, then transferred to bay 20 and then moved along that bay in the same manner in which the machine was moved along bays 12, 14 and 16.

After machine 22 has completed agitating and conveying the compost in bay 20, the machine is driven onto dolly 26 and switch 304 is actuated. This deactuates carriage drive motor 74 and actuates dolly motor 320, and dolly 26 begins to move further to the right as viewed in FIG. 3. Immediately, or shortly, after dolly 26 begins this further rightward movement, however, an arm (not shown) on bay 20 actuates switch 314, and this causes dolly motor 320 to reverse directions and return the dolly to the above-mentioned home position. Once dolly 26 is in this home position, dolly motor 320 is deactuated, and the dolly and machine 22 come to a stop. Dolly 26 and compost handling machine 22 remain at rest until the above-mentioned routine is restarted the next day.

Although the operation of facility 10 will be apparent from a review of the above, that operation will now be summarized. Organic waste is deposited inside housing 30 at the front, or loading, end of the bays 12, 14, 16 and 20, where the waste is mixed with an appropriate bulking agent. Sawdust has been found to be an effective bulking agent when mixed with the wet waste at a ratio of 0.5 tons of sawdust to each ton of wet waste. It has been found that both chipped waste brush and recycled finished compost can also be used as bulking agents. Because of the extensive mixing obtained at the daily agitation of the compost in bays 12, 14, 16 and 20 it is not necessary to mix thoroughly the mixing agent with the organic waste prior to loading the mixture into the composting bays.

This mixture is then loaded into bays 12, 14, 16 and 20, where it is agitated, aerated and slowly conveyed through the bays while composting takes place. Compost handling machine 22 mixes and moves the compost material down each bay at the rate of 10 feet per day; and after 18 days, the composting is complete, and dry, stable compost arrives at the finishing end of the bay. A single machine 22 can serve four composting bays; and each day, machine 22 starts at the finishing ends of the bays, removing the finished compost and moving toward the front ends of the bays.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A composting facility comprising:
   an elongated composting bay to receive organic waste material and to hold the material while it composts, the bay including a frame defining an interior of the bay;
   a compost handling machine adapted to move along the frame and to extend into the composting bay to agitate the compost in, and to move the compost along, the bay; and
   a ventilation system in communication with the interior of the bay to selectively conduct air into the compost to ventilate the compost and to help control the temperature thereof, the ventilation system including
   (i) a sensor located in the bay to sense the temperature of the compost and to generate a signal in response to said temperature, and
   (ii) control means connected to the sensor to receive said signal therefrom and to actuate the ventilation system to conduct air into the compost when the temperature thereof rises above a preset value;
   wherein the frame of the bay defines a recess extending outward from the interior of the bay, the sensor is located in the recess, and the composting bay further includes a cover plate releasably connected to the frame, and covering the recess to hold the sensor therein and to keep the compost out of the recess.

2. A composting facility according to claim 1, wherein:
   the magnitude of the signal generated by the sensor is dependent on the temperature of the compost; and
   the control means compares the magnitude of said signal and actuates the ventilation system to conduct air into the compost when the magnitude of the signal rises above a set point value.

3. A composting facility according to claim 2, wherein the control means includes means to adjust said set point value.

4. A composting facility according to claim 1, wherein:
the frame includes a floor and left and right side walls; and
the recess is defined by one of the side walls of the frame.

5. A composting facility according to claim 4, wherein the ventilation system includes:
means to provide a source of air;
a multitude of bay lines located in the floor of the frame, each bay line having a multitude of outlets in communication with the interior of the bay to discharge air thereinto from the bay line; and
means to conduct air to the lines from the source of air.

6. A composting facility according to claim 4, wherein the sensor is held against the cover plate to facilitate thermal communication between the sensor and the compost in the bay.

7. A composting facility according to claim 6, wherein the cover plate is maintained spaced from said one of the side walls to inhibit thermal communication between the bay and the sensor.

8. A composting facility according to claim 7, wherein the composting bay further insulating material substantially filling the recess, between the sensor and said one of the side walls, to inhibit heat transfer between the sensor and said one of the side walls.

9. A composting facility comprising:
an elongated composting bay to receive organic waste material and to hold the material while it composts, and including a plurality of sections;
a compost handling machine adapted to move along the composting bay to agitate the compost in, and to move the compost along, the bay; and
a ventilation system in communication with the compost in the bay to selectively conduct air thereinto to ventilate the compost and to help control the temperature thereof, the ventilation system including
(i) a multitude of sensors, each sensor being in thermal communication with a respective one of the sections of the composting bay to generate a signal in response to the temperature of the compost in said one section, and
(ii) a multitude of control means, each control means being connected to a respective one of the sensors to receive said signal therefrom and to actuate the ventilation system to conduct air into the compost in a respective one section when the temperature of the compost therein rises above a preset value, wherein the ventilation system maintains a desired compost temperature profile in the bay;
wherein the frame of the bay includes a floor and side walls, the side walls forms a multitude of recesses, and the sensors are located in said recesses.

10. A composting facility according to claim 9, wherein:
the plurality of sections of the composting bay includes at least first and second sections; and
the multitude of sensors of the ventilation system includes (i) a first sensor located in the first section of the bay to sense the temperature of the compost in said first section,
(ii) a second sensor located in the second section of the bay to sense the temperature of the compost in said second section; and
the multitude of control means includes
(i) a first control means connected to the first sensor to actuate the ventilation system to conduce air into the first section of the bay when the temperature of the compost in said first section rises above a first preset value, and
(ii) a second control means connected to the second sensor to actuate the ventilation system to conduct air into the second section of the bay when the temperature of the compost in said second section rises above a second preset value.

11. A composting facility according to claim 10, wherein:
the bay includes forward and rearward sections;
the first section of the bay comprises the forward section thereof, and the first section extends rearwardly for a preset distance; and
the second section of the bay is located rearward of the first section, and extends rearwardly for a predetermined distance.

12. A composting facility according to claim 10, wherein:
the ventilation system further includes
(i) first blower means to selectively provide a second source of air,
(ii) second blower means to selectively provide a second source of air,
(iii) means to conduct air into the first section of the bay from the first blower means;
(iv) means to conduct air into the second section of the bay from the second blower means;
the first control means is connected to the first blower means and actuates the first blower means to direct air into the first section of the bay when the temperature of the compost in said first section rises above the first preset value; and
the second control means is connected to the second blower means and actuates the second blower means to direct air into the second section of the bay when the temperature of the compost in said second section rises above the second preset value.

13. A composting facility according to claim 10, wherein:
the bay includes forward and rearward sections;
the plurality of sections further includes third, fourth and fifth sections;
the first section of the bay comprises the forward section thereof, and the first section extends rearwardly for a first preset distance;
the second section of the bay is located rearward of the first section and extends rearwardly for a second preset distance;
the third section of the bay is located rearward of the second section and extends rearwardly for a third preset distance;
the fourth section of the bay is located rearward of the third section and extends rearwardly for a fourth preset distance;
the fifth section of the bay is located rearward of the fourth section and comprises the rearward section of the bay;
the ventilation system further includes (i) a third sensor located in the third section of the bay to sense the temperature of the compost in said third section, and a third control means connected to the third sensor to actuate the ventilation system to conduct air into the compost in the third section of the bay when the temperature of the compost in said third section rises above a third preset value, (ii) a fourth sensor located in the fourth section of the bay to sense the temperature of the compost in said fourth sensor to actuate the ventilation system to conduct air into the compost in the fourth section of the bay when the temperature of the compost in said fourth section rises above a fourth preset value, and (iii) a fifth sensor located in the fifth section of the bay to sense the temperature of the compost in said fifth section, and a fifth control means connected to the fifth sensor to actuate the ventilation system to conduct air into the compost in the fifth section of the bay when the temperature of the compost in said fifth section rises above a fifth preset value.

* * * * *

UNITED STATES PATENT AND TRADEMARK OFFICE
CERTIFICATE OF CORRECTION

PATENT NO. : 4,869,877

DATED : September 26, 1989

INVENTOR(S) : Paul C. Sellew, et al.

It is certified that error appears in the above-identified patent and that said Letters Patent is hereby corrected as shown below:

Column 5, line 27: "rotatable" should read as --rotatably--

Column 8, line 45: "ad" should read as --and--

Column 11, line 31: "4a" should read as --34a--

Column 12, line 24: "profiles" should read as --profiles.--

Column 13, line 67: "3" should read as --32--

Column 14, line 9: "value" should read as --value.--

Column 14, line 67: "-56°" should read as --56°--

UNITED STATES PATENT AND TRADEMARK OFFICE
CERTIFICATE OF CORRECTION

PATENT NO. : 4,869,877

DATED : September 26, 1989

INVENTOR(S) : Paul C. Sellew, et al.

It is certified that error appears in the above-identified patent and that said Letters Patent is hereby corrected as shown below:

Column 19, line 31, Claim 8: "further insulating" should read as --further includes insulating--

Column 21, line 10, Claim 13: after "fourth" add --section, and a fourth control means connected to the fourth--

Signed and Sealed this

Nineteenth Day of February, 1991

Attest:

HARRY F. MANBECK, JR.

*Attesting Officer*      *Commissioner of Patents and Trademarks*